US012574518B2

(12) United States Patent
Zhang et al.

(10) Patent No.: US 12,574,518 B2
(45) Date of Patent: Mar. 10, 2026

(54) MATRIX MULTIPLICATION PROCESS FOR MATRIX BASED INTRA PREDICTION (MIP)

(71) Applicant: Telefonaktiebolaget LM Ericsson (publ), Stockholm (SE)

(72) Inventors: Zhi Zhang, Solna (SE); Ruoyang Yu, Täby (SE); Rickard Sjöberg, Stockholm (SE); Kenneth Andersson, Gävle (SE); Jacob Ström, Stockholm (SE); Davood Saffar, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 877 days.

(21) Appl. No.: 17/425,919

(22) PCT Filed: Jul. 22, 2020

(86) PCT No.: PCT/SE2020/050746
§ 371 (c)(1),
(2) Date: Jul. 26, 2021

(87) PCT Pub. No.: WO2021/054881
PCT Pub. Date: Mar. 25, 2021

(65) Prior Publication Data
US 2022/0182632 A1 Jun. 9, 2022

Related U.S. Application Data

(60) Provisional application No. 62/902,556, filed on Sep. 19, 2019.

(51) Int. Cl.
*H04N 19/132* (2014.01)
*H04N 19/105* (2014.01)
(Continued)

(52) U.S. Cl.
CPC ......... *H04N 19/132* (2014.11); *H04N 19/105* (2014.11); *H04N 19/159* (2014.11); *H04N 19/176* (2014.11)

(58) Field of Classification Search
CPC .. H04N 19/132; H04N 19/105; H04N 19/159; H04N 19/176; H04N 19/11; H04N 19/157; H04N 19/593
See application file for complete search history.

(56) References Cited

U.S. PATENT DOCUMENTS 10,200,715 B2   2/2019   Pettersson et al.
2019/0045188 A1   2/2019   Mahdi et al.
(Continued)

FOREIGN PATENT DOCUMENTS

CN   109417633 A   3/2019
CN   114145016 A * 3/2022 ........... H04N 19/593
(Continued)

OTHER PUBLICATIONS

International Search Report and Written Opinion issued in International Application No. PCT/SE2020/050746 dated Oct. 27, 2020 (13 pages).
(Continued)

*Primary Examiner* — Hesham K Abouzahra
(74) *Attorney, Agent, or Firm* — Rothwell, Figg, Ernst & Manbeck, P.C.

(57) ABSTRACT

A MIP method (700) for predicting samples of a current block. The method includes storing (s702) a set of MIP weight matrices. The method also includes determining (s704) the width, W, and the height, H, of the current block. The method further includes setting (s706) a mipSizeId variable to 1 as a result of: i) determining that W=4 storing a set of MIP weight matrices and H=16 or ii) determining that W=16 and H=4. The method further includes storing
(Continued)

(s708) a value, predModeIntra, that specifies a MIP prediction mode for the current block. The method further includes determining (s710), based on predModeIntra and the value of the mipSizeId variable, a modeId value. And the method further includes selecting (s712), from the set of MIP weight matrices, a MIP weight matrix to be used for the current block, wherein the selection is based on modeId and the value of the mipSizeId variable.

20 Claims, 10 Drawing Sheets

(51) Int. Cl.
H04N 19/159 (2014.01)
H04N 19/176 (2014.01)

(56) References Cited

U.S. PATENT DOCUMENTS

2020/0007863 A1    1/2020  Xu et al.
2020/0359050 A1*  11/2020  Van der Auwera .... H04N 19/80

FOREIGN PATENT DOCUMENTS

WO         2018/205950  A1    11/2018
WO         WO-2020256597  A1 *  12/2020  ............. H04N 19/42

OTHER PUBLICATIONS

Yasugi, Yukinobu et al., "Non-CE3: MIP simplification", Joint Video Experts Team (JVET) of ITU-T SG 16 WP 3 and ISO/IEC JTC 1/SC 29/WG 11, Document: JVET-P0289, 16th Meeting: Geneva, CH, Oct. 2019 (4 pages).

Zhang, Z. et al., "Non-CE3: Align MIP matrix multiplication process", Joint Video Experts Team (JVET) of ITU-T SG 16 WP 3 and ISO/IEC JTC 1/SC 29/WG 11, Document: JVET-P0199-v1, 16th Meeting: Geneva, CH, Oct. 2019 (6 pages).

Ma, Yanzhuo et al., "Non-CE3: MIP Simplification", Joint Video Experts Team (JVET) of ITU-T SG 16 WP 3 and ISO/IEC JTC 1/SC 29/WG 11, Document: JVET-O0324, 15th Meeting: Gothenburg, SE, Jul. 2019 (6 pages).

Pfaff, Jonathan et al., "CE3: Affine linear weighted intra prediction (CE3-4.1, CE3-4.2)", Joint Video Experts Team (JVET) of ITU-T SG 16 WP 3 and ISO/IEC JTC 1/SC 29/WG 11, Document: JVET-N0217, 14th Meeting: Geneva, CH, Mar. 2019 (17 pages).

Bross, Benjamin et al., "Versatile Video Coding (Draft 6)", Joint Video Experts Team (JVET) of ITU-T SG 16 WP 3 and ISO/IEC JTC 1/SC 29/WG 11, Document: JVET-O02001vE, 15th Meeting: Gothenburg, SE, Jul. 2019 (455 pages).

Zhao, L., et al., "Non-CE3: Simplifications for MIP", Joint Video Experts Team (JVET) of ITU-T SG 16 WP 3 and ISO/IEC JTC 1/SC 29/WG 11, Document: JVET-O0171, 15th Meeting: Gothenburg, SE Jul. 3-12, 2019 (3 pages).

Zhang, et. al., "Non-CE3: Enable MIP prediction for 64×N or N×64 blocks at maximum transform size 32", Joint Video Experts Team (JVET) of ITU-T SG 16 WP 3 and ISO/IEC JTC 1/SC 29/WG 11, Document: JVET-P0198-v2, 16th Meeting: Geneva, CH, Oct. 2019 (5 pages).

* cited by examiner

100
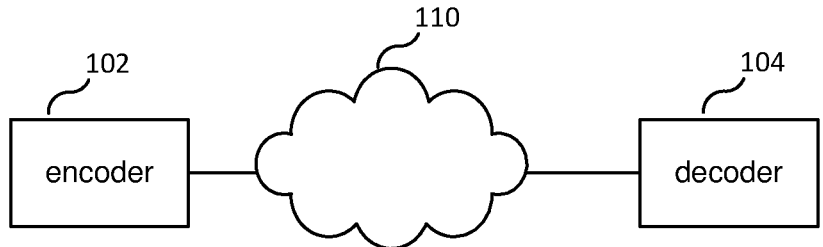
FIG. 1

104

700

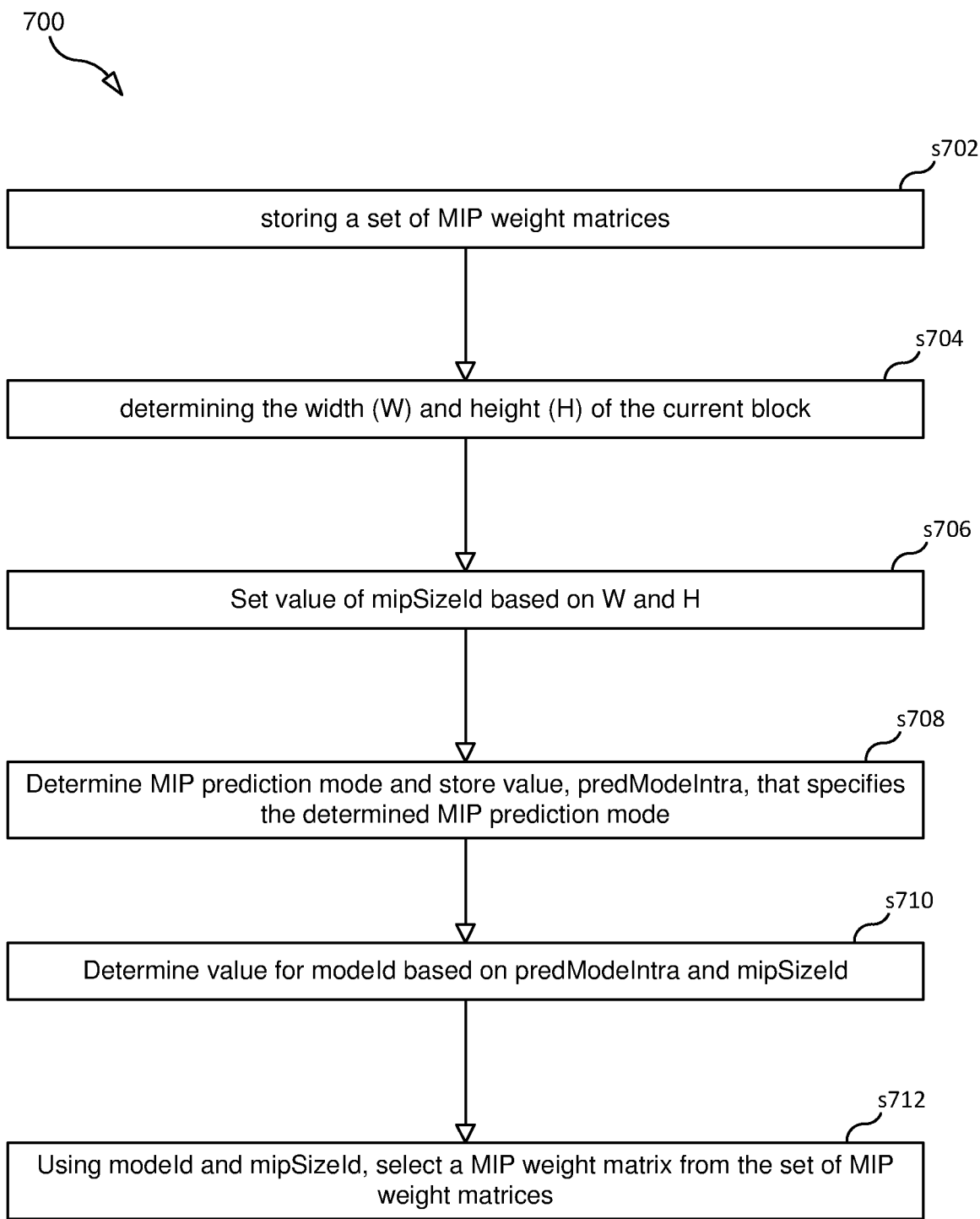

s702 storing a set of MIP weight matrices s704 determining the width (W) and height (H) of the current block s706

Set value of mipSizeId based on W and H s708

Determine MIP prediction mode and store value, predModeIntra, that specifies the determined MIP prediction mode s710

Determine value for modeId based on predModeIntra and mipSizeId s712

Using modeId and mipSizeId, select a MIP weight matrix from the set of MIP weight matrices

| | | |
|---|---|---|
| Matrix storing module 1002 | Dimensions determining module 1004 | mipSizeId setting module 1006 |
| Mode value storing module 1008 | modeId determining module 1010 | Selecting module 1012 |

MATRIX MULTIPLICATION PROCESS FOR MATRIX BASED INTRA PREDICTION (MIP)

CROSS REFERENCE TO RELATED APPLICATIONS

This application is a 35 U.S.C. § 371 National Stage of International Patent Application No. PCT/SE2020/050746, filed Jul. 22, 2020, designating the United States and claiming priority to U.S. provisional application No. 62/902,556, filed on Sep. 19, 2019. The above identified applications are incorporated by reference.

TECHNICAL FIELD

This disclosure relates to video coding and decoding.

BACKGROUND

1. HEVC and VVC

High Efficiency Video Coding (HEVC) is a block-based video codec standardized by ITU-T and MPEG that utilizes both temporal and spatial prediction. Spatial prediction is achieved using intra (I) prediction from within the current picture. Temporal prediction is achieved using uni-directional (P) or bi-directional inter (B) prediction on a block level from previously decoded reference pictures. In the encoder, the difference between the original pixel data and the predicted pixel data, referred to as the residual, is transformed into the frequency domain, quantized and then entropy coded before transmitted together with necessary prediction parameters such as prediction mode and motion vectors, also entropy coded. The decoder performs entropy decoding, inverse quantization and inverse transformation to obtain the residual, and then adds the residual to an intra or inter prediction to reconstruct a picture.

MPEG and ITU-T is working on the successor to HEVC within the Joint Video Exploratory Team (WET). The name of this video codec under development is Versatile Video Coding (VVC). At the time of writing, the current version of the VVC draft specification was "Versatile Video Coding (Draft 6)", JVET-O2001-vE. When VVC is referred in this document it refers to the Draft 6 of the VVC specification.

2. Components

A video sequence consists of a series of pictures where each picture consists of one or more components. Each component can be described as a two-dimensional rectangular array of sample values. It is common that a picture in a video sequence consists of three components: one luma component (Y) where the sample values are luma values, and two chroma components (Cb) and (Cr), where the sample values are chroma values. It is common that the dimensions of the chroma components are smaller than the luma components by a factor of two in each dimension. For example, the size of the luma component of an HD picture would be 1920×1080 and the chroma components would each have the dimension of 960×540. Components are sometimes referred to as color components. In this document, we describe methods useful for the encoding and decoding of video sequences. However, it should be understood that the techniques described can also be used for encoding and decoding of still images.

3. Blocks and Units

A block is a two-dimensional array of samples. In video coding, each component is split into one or more blocks and the coded video bitstream is a series of blocks.

It is common in video coding that the picture is split into units that cover a specific area. Each unit consists of all blocks that make up that specific area and each block belongs fully to only one unit. The coding unit (CU) in HEVC and VVC is an example of such a unit. A coding tree unit (CTU) is a logical unit which can be split into several CUs.

In HEVC, CUs are squares, i.e., they have a size of N×N luma samples, where N can have a value of 64, 32, 16 or 8. In the current H.266 test model Versatile Video Coding (VVC), CUs can also be rectangular, i.e. have a size of N×M luma samples where N is different to M.

4. Intra Prediction

There are two types of sample predictions: intra prediction and inter prediction. Intra prediction predicts blocks based on spatial extrapolation of samples from previously decoded blocks of the same (current) picture. It can also be used in image compression, i.e., compression of still images where there is only one picture to compress/decompress. Inter prediction predicts blocks by using samples for previously decoded pictures.

5. Intra Directional Prediction

Intra directional prediction is utilized in HEVC and VVC. In HEVC, there are 33 angular modes and 35 modes in total. In VVC, there are 65 angular modes and 67 modes in total. The remaining two modes, "planar" and "DC" are non-angular modes. Mode index 0 is used for the planar mode, and mode index 1 is used for the DC mode. The angular prediction mode indices range from 2 to 34 for HEVC and from 2 to 66 for VVC.

Intra directional prediction is used for all components in the video sequence, e.g., the luma component Y, and the two chroma components Cb and Cr.

6. Matrix Based Intra Prediction

Matrix based intra prediction (MIP) is a coding tool that is included in the current version of the VVC draft. For predicting the samples of a current block of width W and height H, MIP takes one column of H reconstructed neighbouring boundary samples to the left of the current block and one row of W reconstructed neighbouring samples above the current block as input. The predicted samples for the current block are derived based on the following three steps:

(Step 1) For both the neighboring row and column boundary, two or four samples are extracted by averaging samples for each boundary ($bdry_{top}$ and $bdry_{left}$) using an averaging method that depends on the current block dimension. The extracted averaged boundary samples are named as reduced boundary, $bdry_{red}$.

(Step 2) A matrix vector multiplication is carried out using the extracted averaged boundary samples as input. The output is a reduced prediction signal consisting of a set of predicted sample values where each predicted sample corresponds to a position in the current block, and where the set of positions is a subset of all positions of the current block. The output reduced prediction signal is named as $pred_{red}$.

(Step 3) The prediction sample values for the remaining positions in the current block that is not in the set of positions are generated from the reduced prediction signal by linear interpolation, which is a single step linear interpolation in each direction (vertical and horizontal). The prediction signal consists of all prediction sample values for the block. The order of interpolation depends on the relative width (W) and height (H) of the block.

If H>W, the horizontal linear interpolation is first applied by using the reduced left boundary samples which are named as $bdry_{red}^{left}$ or $bdry_{redII}^{left}$ depending on the current block dimension. A vertical linear interpolation is applied after horizontal linear interpolation by using the original top boundary $bdry_{top}$. Depending on the block size, the horizontal and/or the vertical linear interpolation may not be carried out for a block.

If H≤W, the vertical linear interpolation is first applied by using the reduced top boundary samples which are named as $bdry_{red}{}^{top}$ or $bdry_{redII}{}^{top}$ depending on the current block dimension. A horizontal linear interpolation is applied after vertical linear interpolation by using the original left boundary $bdry_{left}$. Depending on the block size, the horizonal and/or the vertical linear interpolation may not be carried out for a block.

Given a 4×4 block, the $bdry_{red}$ contains 4 samples which are derived from averaging every two samples of each boundary. The dimension of $pred_{red}$ is 4×4, which is same as the current block. Therefore, the horizontal and vertical linear interpolation can be skipped. FIG. 4A shows an example of the MIP process for a 4×4 block.

Given an 8×4 block, the $bdry_{red}$ contains 8 samples which are derived from the original left boundary and averaging every two samples of the top boundary. The dimension of $pred_{red}$ is 4×4. The prediction signal at the remaining positions is generated from the horizontal linear interpolation by using the original left boundary $bdry_{left}$. FIG. 4B shows an example of MIP process for an 8×4 block.

Given a W×4 block, where W≥16, the $bdry_{red}$ contains 8 samples which are derived from the original left boundary and averaging every W/4 samples of the top boundary. The dimension of $pred_{red}$ is 8×4. The prediction signal at the remaining positions is generated from the horizontal linear interpolation by using the original left boundary $bdry_{left}$.

Given a 4×8 block, the $bdry_{red}$ contains 8 samples which are derived from averaging every two samples of the left boundary and the original top boundary. The dimension of $pred_{red}$ is 4×4. The prediction signal at the remaining positions is generated from the vertical linear interpolation by using the original top boundary $bdry_{top}$.

Given a 4×H block, where H≥16, the $bdry_{red}$ contains 8 samples which are derived from averaging every H/4 samples of the left boundary and the original top boundary. The dimension of $pred_{red}$ is 4×8. The prediction signal at the remaining positions is generated from the vertical linear interpolation by using the original top boundary $bdry_{top}$. FIG. 5A shows an example of MIP process for a 4×16 block.

Given an 8×8 block, the $bdry_{red}$ contains 8 samples which are derived from averaging every two samples of each boundary. The dimension of $pred_{red}$ is 4×4. The prediction signal at the remaining positions is generated from firstly the vertical linear interpolation by using the reduced top boundary $bdry_{red}{}^{top}$, secondly the horizontal linear interpolation by using the original left boundary $bdry_{left}$. FIG. 5B shows an example of the MIP process for an 8×8 block.

Given a W×8 block, where W≥16, the $bdry_{red}$ contains 8 samples which are derived from averaging every two samples of left boundary and averaging every W/4 samples of top boundary. The dimension of $pred_{red}$ is 8×8. The prediction signal at the remaining positions is generated from the horizontal linear interpolation by using the original left boundary $bdry_{left}$. FIG. 6A shows an example of MIP process for a 16×8 block.

Given an 8×H block, where H≥16, the $bdry_{red}$ contains 8 samples which are derived from averaging every H/4 samples of the left boundary and averaging every two samples of the top boundary. The dimension of $pred_{red}$ is 8×8. The prediction signal at the remaining positions is generated from the vertical linear interpolation by using the original top boundary $bdry_{top}$.

Given a W×H block, where W≥16 and H≥16, the $bdry_{red}$ contains 8 samples which are derived as follows:

(1) For H≤W, firstly, $bdry_{redII}{}^{top}$ contains 8 samples that are derived by averaging every W/8 samples of top boundary. Secondly, $bdry_{red}$ contains 8 samples are derived from averaging every H/4 samples of the left boundary and averaging every two samples of the $bdry_{redII}{}^{top}$.

(2) For H>W, firstly $bdry_{redII}{}^{left}$ contains 8 samples are derived by averaging every H/8 samples of left boundary. Secondly, the $bdry_{red}$ contains 8 samples are derived from averaging every two of the $bdry_{redII}{}^{left}$ and every W/4 samples of the top boundary.

The dimension of $pred_{red}$ is 8×8. The prediction signal at the remaining positions is generated by using linear interpolation as follows:

(1) For H≤W, firstly the vertical linear interpolation by using the reduced top boundary samples $bdry_{redII}{}^{top}$, which are derived by averaging every W/8 samples of top boundary, secondly the horizontal linear interpolation by using the original left boundary $bdry_{left}$.

(2) For H>W, firstly the horizontal linear interpolation by using the reduced left boundary samples $bdry_{redII}{}^{left}$, which are derived by averaging every H/8 samples of top boundary, secondly the vertical linear interpolation by using the original top boundary $bdry_{top}$.

FIG. 6B shows an example of MIP process for a 16×16 block.

In the current version of VVC, the MIP is applied for the luma component only.

In the current version of VVC, given a W×H block, the MIP can be applied to the current block when W/H or H/W ratio is equal or less than 4. In another word, the MIP is disabled to a block which has a dimension: 4×32, 32×4, 4×64, 64×4, 8×64 or 64×8.

7. Mipsizeid mipSizeId is a variable that is used to determine the number of input samples of reduced boundary, the number of output samples of reduced prediction, and the MIP weight matrix to be used for the current block.

In the current version of VVC, the mipSizeId is determined from the dimension of the current block. Given a W×H block, the mipSizeId is determined as follows: if both W and H are equal to 4, then mipSizeId is set equal to 0; if both W and H are not equal to 4 but both W and H are less than or equal to 8, then mipSizeId is set to 1; else, mipSizeId is set to 2.

8. MIP Weight Matrix and MIP Prediction Mode

The MIP prediction mode is used in a derivation process for selecting a MIP weight matrix from a matrix look-up table. The MIP prediction mode can be determined from decoding the bitstream. In the current version of VVC, the number of MIP prediction modes (or "MIP modes" for short) is specified by mipSizeId as follows: if mipSizeId is equal to 0, then number of MIP prediction modes, numModes, is 35; if mipSizeId is equal to 1, then numModes is 19; and if mipSizeId is equal to 2, then numModes is 11. This is illustrated in table 8-4 of VVC, which is reproduced below as table 0:

TABLE 0

| mipSizeId | numModes | boundarySize | predW | predH | predC |
|---|---|---|---|---|---|
| 0 | 35 | 2 | 4 | 4 | 4 |
| 1 | 19 | 4 | 4 | 4 | 4 |
| 2 | 11 | 4 | Min(nTbW, 8) | Min(nTbH, 8) | 8 |

In the current version of VVC, MIP is not allowed for the current block when: the value W/H is greater than 4 or the value HAY is greater than 4 (i.e., if one dimension is greater than 4 time the other dimension, then MIP is not allowed and numModes is zero).

The MIP weight matrix to be used for MIP prediction is derived from a matrix look-up table by using a MIP size Id value, mipSizeId, and a mode Id value, modeId. For example, when mipSizeId is equal to 0 and modeId is equal to 0, the MIP weight matrix, size M×N where M is equal to 16 and N is equal to 4, is derived as:

TABLE 1

{
{37, 59, 77, 28}, {32, 92, 85, 25}, {31, 69, 100, 24}, {33, 36, 106, 29},
{24, 49, 104, 48}, {24, 21, 94, 59}, {29, 0, 80, 72}, {35, 2, 66, 84},
{32, 13, 35, 99}, {39, 11, 34, 103}, {45, 21, 34, 106}, {51, 24, 40, 105},
{50, 28, 43, 101}, {56, 32, 49, 101}, {61, 31, 53, 102}, {61, 32, 54, 100}
}, modeId is determined based on the determined MIP prediction mode (denoted predModeIntra) and numModes. Specifically, according to VVC:

modeId=predModeIntra−(isTransposed?numModes/2:
    0)

where isTransposed=(predModeIntra>(numModes/
    2))?TRUE:FALSE.

The MIP weight matrix is 2-D matrix. The size of a MIP weight matrix (or "MIP matrix" for short) can be represented as M×N, where N is equal to the number of input samples of $bdry_{red}$ (MIP INPUT) and M is equal or greater than the number of output samples of $pred_{red}$ (MIP OUTPUT). The matrix multiplication of the MIP weight matrix with the input vector yields a vector of M samples, which are spatially located in a square matrix with size predC, where M=predC×predC.

The MIP OUTPUT is a 2-D matrix which has a dimension of predW×predH. The size of MIP OUTPUT can be represented as predW×predH.

The size of MIP INPUT and MIP OUTPUT depends on mipSizeId. Table 2 shows the size of MIP INPUT, MIP OUTPUT and the size of MIP weight matrix for each mipSizeId:

TABLE 2

| The size of MIP INPUT, MIP OUPUT and the size of MIP weight matrix for each mipSizeId | | | | | |
|---|---|---|---|---|---|
| mipSizeId | MIP INPUT size | predW | predH | predC | N |
| 0 | 4 | 4 | 4 | 4 | 4 |
| 1 | 8 | 4 | 4 | 4 | 8 |
| 2 | 8 | min (W, 8) | min (H, 8) | 8 | 8 |

SUMMARY

Certain challenges exist. For example, in the current version of VVC, the MIP process of a 16×4 or 4×16 block is not aligned with the MIP process of other blocks. The handling of matrix multiplication with a MIP weight matrix, mWeight[M][N], where M is greater than MIP OUTPUT increases the complexity of MIP process.

This disclosure simplifies the MIP process such that for all MIP coded blocks, the selected MIP weight matrix, mWeight [M][N], to be used for matrix multiplication is such that M is equal to the size of MIP OUTPUT. In other words, the size of MIP OUPUT is determined to be equal to the size of one dimension (M) of the selected MIP weight matrix. This simplification eliminates the handling of matrix multiplication with a MIP weight matrix (mWeight[M][N]) where M is greater than the size of MIP OUTPUT. The simplification aligns the matrix multiplication process for all MIP coded blocks. An advantage, therefore, is a reduction of the coding complexity of the MIP process. This is done by eliminating the handling of matrix multiplication with a MIP weight matrix where M is greater than the size of MIP OUTPUT. The simplification aligns the matrix multiplication process for all MIP coded blocks.

Accordingly, in one aspect there is provided a MIP method for predicting samples of a current block. In one embodiment the method includes storing a set of MIP weight matrices. The method also includes determining the width, W, and the height, H, of the current block. The method further includes setting a mipSizeId variable to 1 as a result of: i) determining that W=4 and H=16 or ii) determining that W=16 and H=4. The method further includes storing a value, predModeIntra, that specifies a MIP prediction mode for the current block. The method further includes determining, based on predModeIntra and the value of the mipSizeId variable, a modeId value. And the method further includes selecting, from the set of MIP weight matrices, a MIP weight matrix to be used for the current block, wherein the selection is based on modeId and the value of the mipSizeId variable.

BRIEF DESCRIPTION OF THE DRAWINGS

FIG. 1 illustrates a system according to an embodiment.

FIG. 7 is a flowchart illustrating a process according to an embodiment.

DETAILED DESCRIPTION

Figure 2:
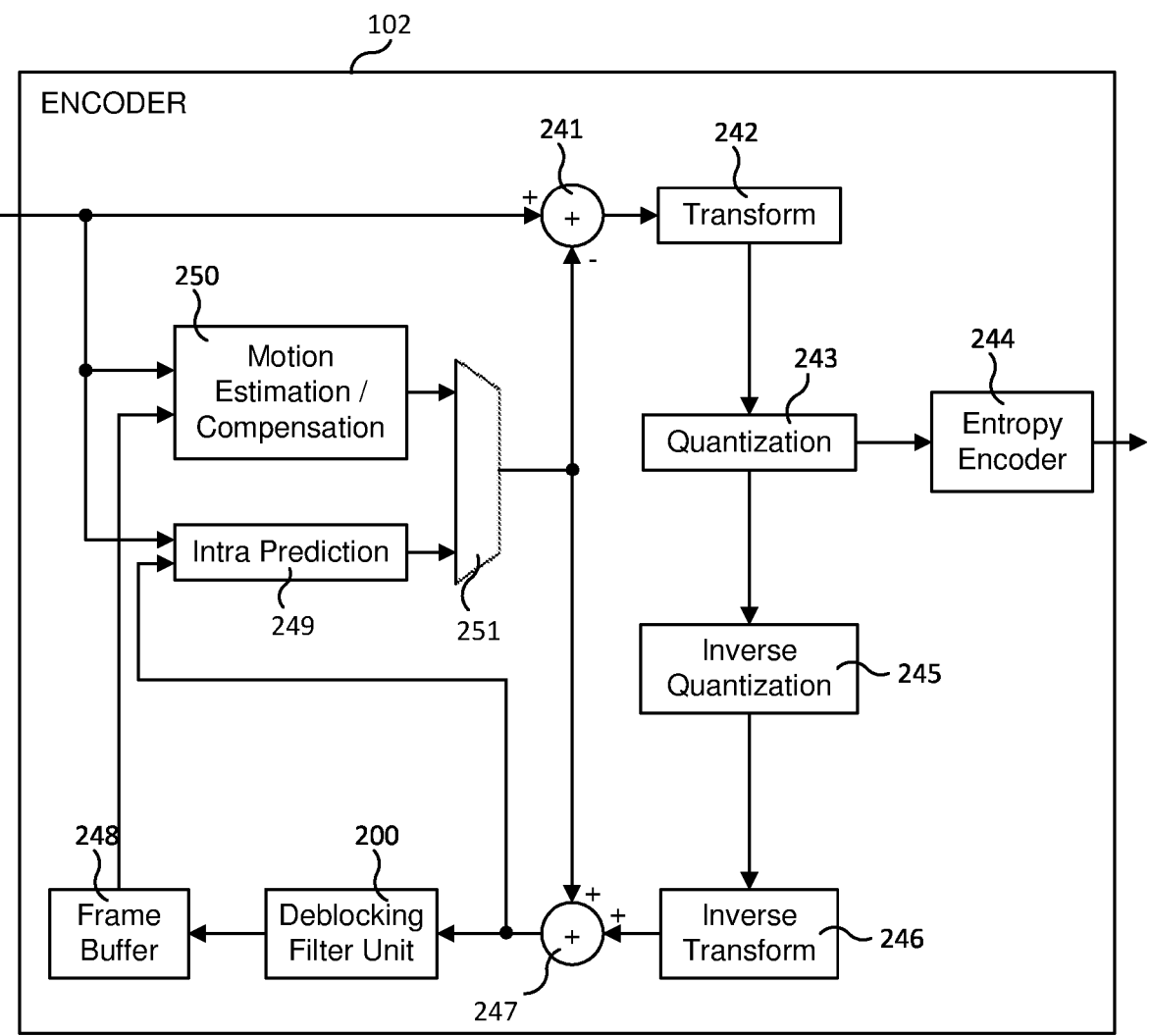
FIG. 2 is a schematic block diagram of a video encoder according to one embodiment.

The term "sample" may be interpreted as "sample value". For example, a sentence "Derive X from the Y samples" may be interpreted as "Derive X from the Y sample values". Similarly, a sentence "The X samples are derived by Y" may be interpreted as "The X sample values are derived by Y". The term "MIP INPUT" can be interpreted as "The extracted reduced boundary bdry$_{red}$ which is used as the input to matrix multiplication". The term "MIP OUTPUT" can be interpreted as "The reduced prediction signal pred$_{red}$ which is the output of matrix multiplication".

FIG. 1 illustrates a system 100 according to an example embodiment. System 200 includes an encoder 202 in communication with a decoder 204 via a network 110 (e.g., the Internet or other network). Deblocking may be performed in both encoder 202 and decoder 204. The embodiments described herein can be used in video encoder 102 or video decoder 104.

FIG. 2 is a schematic block diagram of a video encoder 102 according to one embodiment. A current block of pixels is predicted by performing a motion estimation using motion estimator 250 from an already provided block of pixels in the same frame or in a previous frame. The result of the motion estimation is a motion or displacement vector associated with the reference block, in the case of inter prediction. The motion vector may be used by motion compensator 250 to output an inter prediction of the block of pixels. Intra predictor 249 computes an intra prediction of the current block of pixels. The outputs from the motion estimator/compensator 250 and the intra predictor 249 are input in selector 251 that either selects intra prediction or inter prediction for the current block of pixels. The output from the selector 251 is input to an error calculator in the form of adder 241 that also receives the pixel values of the current block of pixels. Adder 241 calculates and outputs a residual error as the difference in pixel values between the block of pixels and its prediction. The error is transformed in transformer 242, such as by a discrete cosine transform, and quantized by quantizer 243 followed by coding in encoder 244, such as by entropy encoder. In inter coding, also the estimated motion vector is brought to encoder 244 to generate the coded representation of the current block of pixels. The transformed and quantized residual error for the current block of pixels is also provided to an inverse quantizer 245 and inverse transformer 246 to retrieve the original residual error. This error is added by adder 247 to the block prediction output from the motion compensator 250 or intra predictor 249 to create a reference block of pixels that can be used in the prediction and coding of a next block of pixels. This new reference block is first processed by a deblocking filter 200. The processed new reference block is then temporarily stored in frame buffer 248, where it is available to intra predictor 249 and motion estimator/compensator 250.

Figure 3:
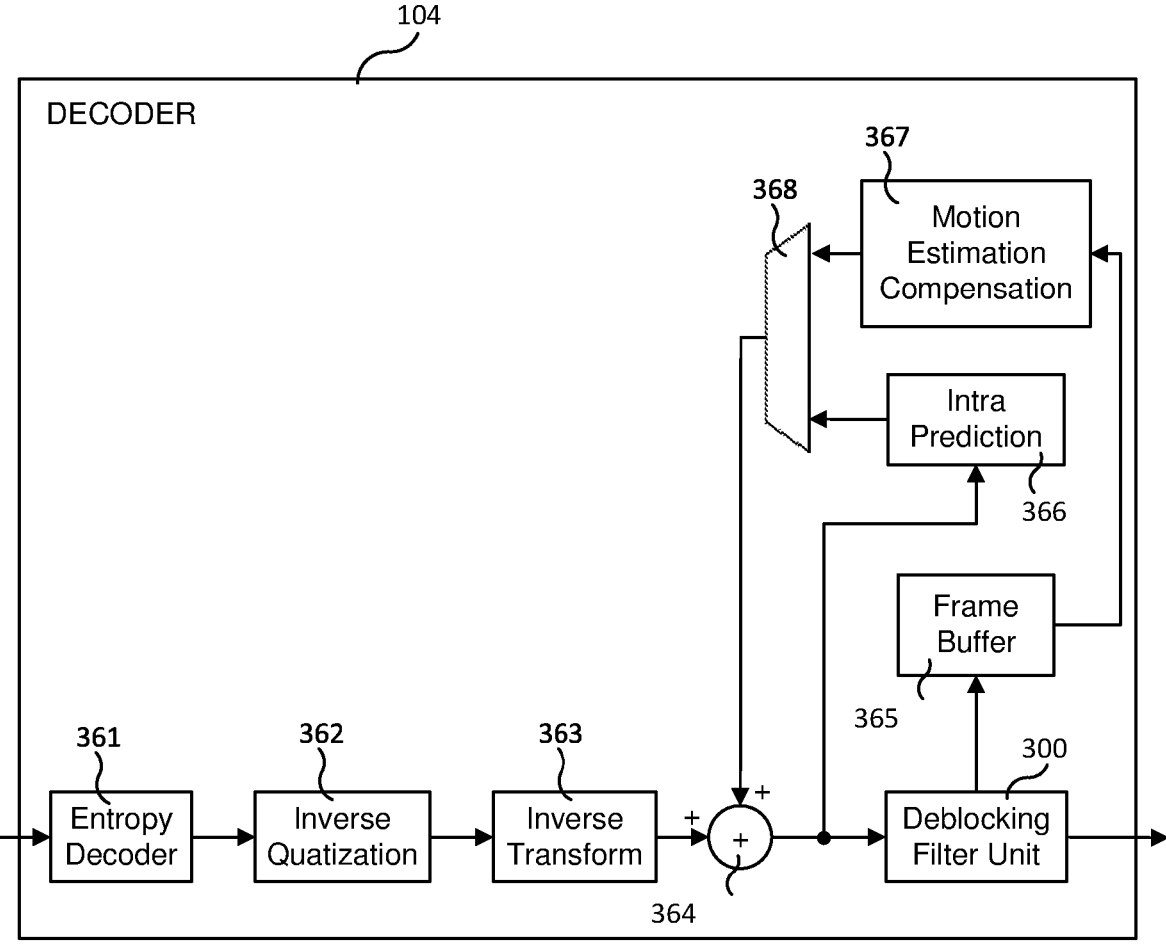
FIG. 3 is a schematic block diagram of a video decoder according to one embodiment.
Figure 4A:
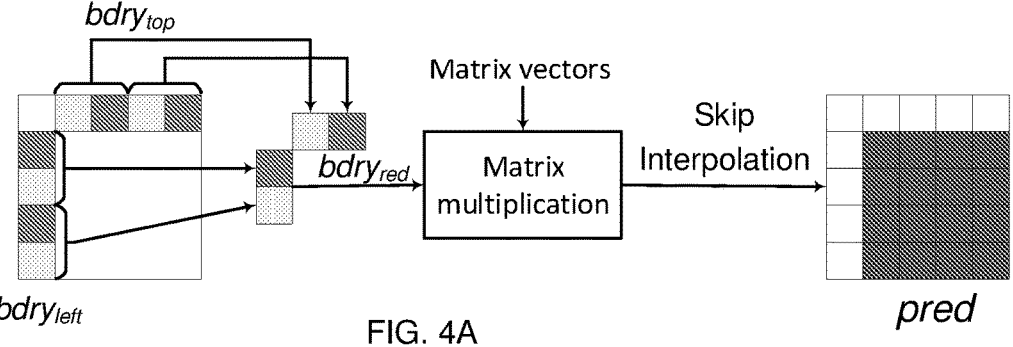
FIG. 4A shows an example of the MIP process for a 4×4 block.
Figure 4B:
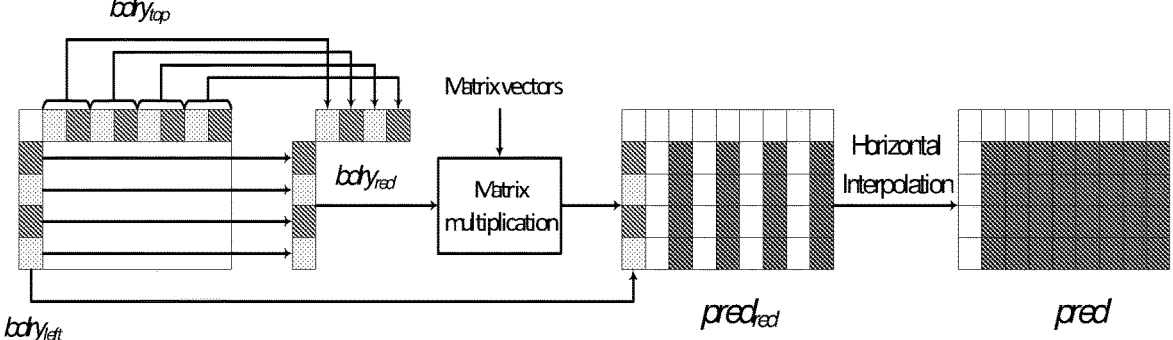
FIG. 4B shows an example of MIP process for an 8×4 block.
Figures 5A, 5B:
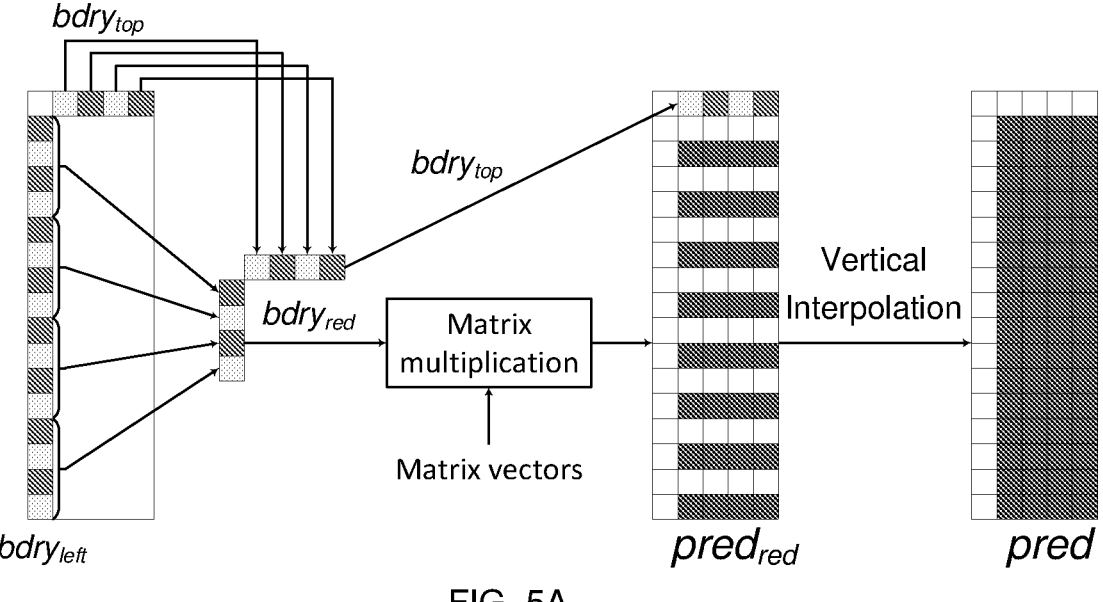
FIG. 5A shows an example of MIP process for a 4×16 block.
FIG. 5B shows an example of the MIP process for an 8×8 block.
Figure 6A:
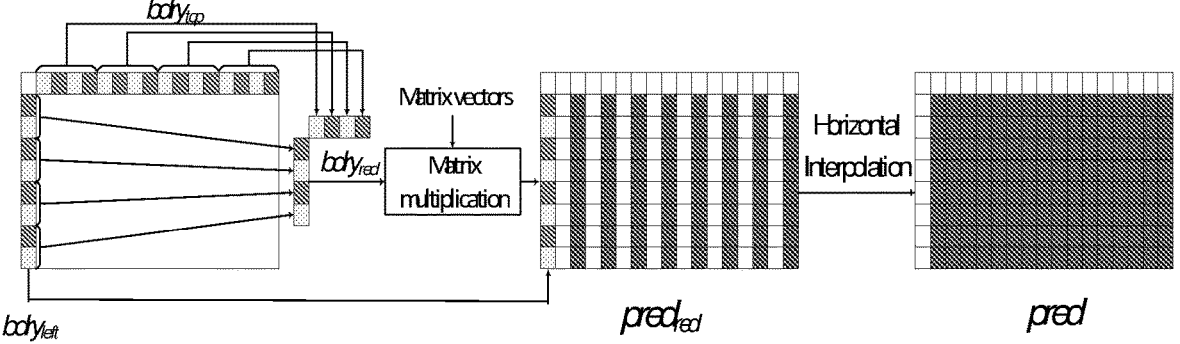
FIG. 6A shows an example of MIP process for a 16×8 block.
Figure 6B:
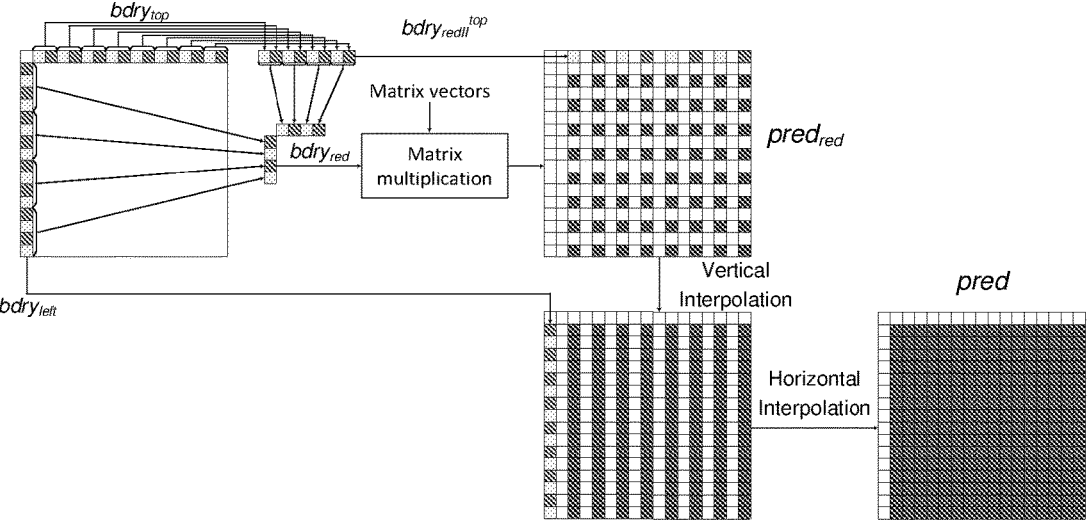
FIG. 6B shows an example of MIP process for a 16×16 block.

FIG. 3 is a block diagram of a video decoder 104 according to some embodiments. Decoder 104 includes a decoder 361, such as entropy decoder, to decode an encoded representation of a block of pixels to get a set of quantized and transformed residual errors. These residual errors are dequantized by inverse quantizer 362 and inverse transformed by inverse transformer 363 to provide a set of residual errors. These residual errors are added by adder 364 to the pixel values of a reference block of pixels. The reference block is determined by a motion estimator/compensator 367 or intra predictor 366, depending on whether inter or intra prediction is performed. Selector 368 is thereby interconnected to adder 364 and motion estimator/compensator 367 and intra predictor 366. The resulting decoded block of pixels output form adder 364 is input to deblocking filter 300. The filtered block of pixels is output from decoder 104 and may be furthermore temporarily provided to frame buffer 365 to be used as a reference block of pixels for a subsequent block of pixels to be decoded. Frame buffer 365 is thereby connected to motion estimator/compensator 367 to make the stored blocks of pixels available to motion estimator/compensator 367. The output from adder 364 may also be input to intra predictor 366 to be used as an unfiltered reference block of pixels.

In the current version of VVC, the size of the MIP weight matrix is M×N, where M specifies the number of matrix multiplication samples. M is equal or greater than the size of MIP OUTPUT.

As shown in table 2, when the mipSizeId is equal to 0 or 1, then M is equal to the size of MIP OUTPUT. (M=predC× predC=predW×predH=16).

As also shown in table 2, when the mipSizeId is equal to 2 and min(W,H) is equal to or greater than 8, M is equal to the size of MIP OUTPUT. (M=predC×predC=predW× predH=64).

As further shown in table 2, when the mipSizeId is equal to 2 and min(W,H) is less than 8, the M is greater than the size of MIP OUTPUT.

Specifically, given a W×H block, M is greater than the size of MIP for a 16×4 or 4×16 block, and M is equal to the size of MIP for all other W×H blocks.

When M is greater than the size of MIP OUTPUT, a subset of the matrix multiplication output is used as MIP OUTPUT and the rest of the matrix multiplication output are discarded.

In the current version of VVC, given a 16×4 or 4×16 block, the mipSizeId is 2, the size of MIP OUTPUT size is 32, the size of MIP weight matrix is M×N, where M is equal to 64 and N is equal to 8. The size of matrix multiplication output is 64, the subset of output with an odd indices is used as MIP OUPUT for the current block and the rest of output with an even indices are discarded.

In other words, given a 16×4 or 4×16 block, the MIP OUTPUT is calculated by:

$$MIP\ OUTPUT_k = \sum_{i=0}^{N-1} MIP\ \text{INPUT}[i] * mWeight[2*k+1][i],$$

$$\text{where } k \text{ ranges from } 0 \text{ to } \left(\frac{M}{2} - 1\right)$$

where, M and N specifies the size of the MIP weight matrix, mWeight[M][N], M is equal to 64, N is equal to 8.

Compared to matrix multiplication for a block with a mWeight[M][N] where M is equal to the size of MIP OUTPUT, the MIP OUTPUT is calculated by:

$$MIP\ OUTPUT_k = \sum_{i=0}^{N-1} MIP\ INPUT[i] * mWeight[k][i],$$

where $k$ ranges from 0 to $(M-1)$ where, M and N specifies the size of mWeight[M][N].

As noted in the Summary section, in the current version of VVC, the MIP process of a 16×4 or 4×16 block is not aligned with the MIP process of other blocks. The handling of matrix multiplication with a MIP weight matrix, mWeight [M][N], where M is greater than MIP OUTPUT increases the complexity of MIP process.

This disclosure provides a process 700 for video encoding or decoding for a current intra predicted block that decreases the MIP process complexity. Process 700 can preferably be applied for a block which is coded by MIP.

Process 700 includes step s702, which comprises storing a set of MIP weight matrices. An example set of weight matrices to are identified in VVC at section 8.4.5.2.3, which is reproduced in the Appendix section of this document. The set of MIP weight matrices may be divided into three different groups (or subsets), where each group of matrices is associated with a different mipSizeId value. For example, each of the three different mipSizeId values identifies one of the groups.

Step s704 comprises determining the width (W) and height (H) of the current block. W and H are determined from decoding syntax element in bitstream.

Step s706 comprises setting the value of variable mipSizeId based on W and H. In one embodiment, mipSizeId is set equal to 1 as a result of determining that W×H is greater than T1 (e.g., 16) but less than or equal to T2 (e.g., 64). In some embodiments, if W×H is equal to 16 then mipSizeId is set to 0, and if W×H is greater than 64, then mipSizeId is set to 2. In some embodiments, the following psuedo-code can be used to set mipSizeId:

```
if W = H = 4, then mipSizeId is set equal to 0;
else if (W × H) is less than or equal to 64, then mipSizeId is set to 1;
else mipSizeId is set to 2.
```

In some embodiments, determining whether W×H is less than or equal to T2 (e.g., 64) comprises determining whether W×H is less than (2×T2) (e.g., 128).

Step s708 comprises determining a MIP prediction mode of the current block and storing a value, predModeIntra, that specifies the determined MIP prediction mode.

Step s710 comprises determining, based on predModeIntra and mipSizeId, a modeId value to be used with the mipSizeId value to select a matrix from the set of matrices.

Step s712 comprises selecting, from the set of MIP weight matrices, a MIP weight matrix to be used for the current block, wherein the selection is based on modeId and mipSizeId. For example, a MIP weight matrix look-up table that maps different mipSizeId-modeId pairs to different MIP weight matrices can be used to select the MIP weight matrix that corresponds to the mipSizeId-modeId pair.

The process 700 selects the MIP weight matrix to apply to the current block such that the number of samples of MIP OUTPUT is equal to the number of samples of the matrix multiplication output of the MIP weight matrix with the MIP INPUT, e.g. size of one dimension (M) of the selected MIP weight matrix, mWeight[M][N].

In some embodiments, the MIP weight matrix look-up table is identical to the look-up table in the current version of VVC.

In other words, the MIP weight matrix to be used for the current block is one of the matrices as follows:

| | Number of Matrices to be selected | Matrix size | |
|---|---|---|---|
| mipSizeId | (numModes) | M | N |
| 0 | 35 | 16 | 4 |
| 1 | 19 | 16 | 8 |
| 2 | 11 | 64 | 8 |

The MIP OUTPUT size is equal to predW×predH. The MIP OUTPUT size is equal to the size of one dimension (M) of the selected MIP weight matrix, mWeight[M][N], where M is equal to predC×predC. Because the output of MIP matrix multiplication yields a square matrix. The predW and predH are derived as:

$$predW=predH=\sqrt{M}=predC \qquad (5\text{-}2\text{-}1)$$

MIP OUTPUT is equal or less than the current block in both horizontal and vertical dimensions. Given a W×H block, the predW is equal or less than W and predH is equal or less than H.

$$predW=predH=predC \le minimum(W,H) \qquad (5\text{-}2\text{-}2)$$

The MIP weight matrix is derived from the mipSizeId and the MIP prediction mode. The mipSizeId is determined based on the width and height of the current block.

In this embodiment, the equation 5-2-2 is one criterion to determine the mipSizeId for the current block:

| mipSizeId | M | predC | minimum (W, H) |
|---|---|---|---|
| 0 | 16 | 4 | 4 |
| 1 | 16 | 4 | 4 |
| 2 | 64 | 8 | 8 |

Given a W×4 or 4×H block, where W is equal or larger than 4, H is equal or larger than 4, according to equation 5-2-2, M is equal or less than 16, therefore, either mipSizeId 0 or mipSizeId 1 can be set to the current block.

Given a W×8 or 8×H block, where W is larger than or equal to 8, H is larger than or equal to 8, according to equation 5-2-2, M is less than or equal to 64, therefore, either mipSizeId 0 or mipSizeId 1 or mipSizeId 2 can be set to the current block.

One example to determine the mipSizeId is as follows:

If $(W \times H)$ is equal to or less than 16, then $mipSizeId$ is set equal to 0

Else if $(W \times H)$ is equal to or less than 64, then $mipSizeId$ is set to 1

Else, $mipSizeId$ is set to 2

Considering the computational complexity (total number of multiplications/the current block size) should be less than a threshold. Given a 4×4 block, the mipSizeId is set to 0, where the matrix selected from mipSizeId 0 gives least computational complexity. In the current version of VVC, the total number of multiplications needed in the computation of the matrix vector product is always smaller than or equal to (4×W×H). In another word, at most four multiplications per sample are required for the MIP coded blocks.

Given a 16×4 or 4×16 block, the mipSizeId is set to 1, where in the current version of VVC, the mipSizeId is set to 2.

Figure 8:
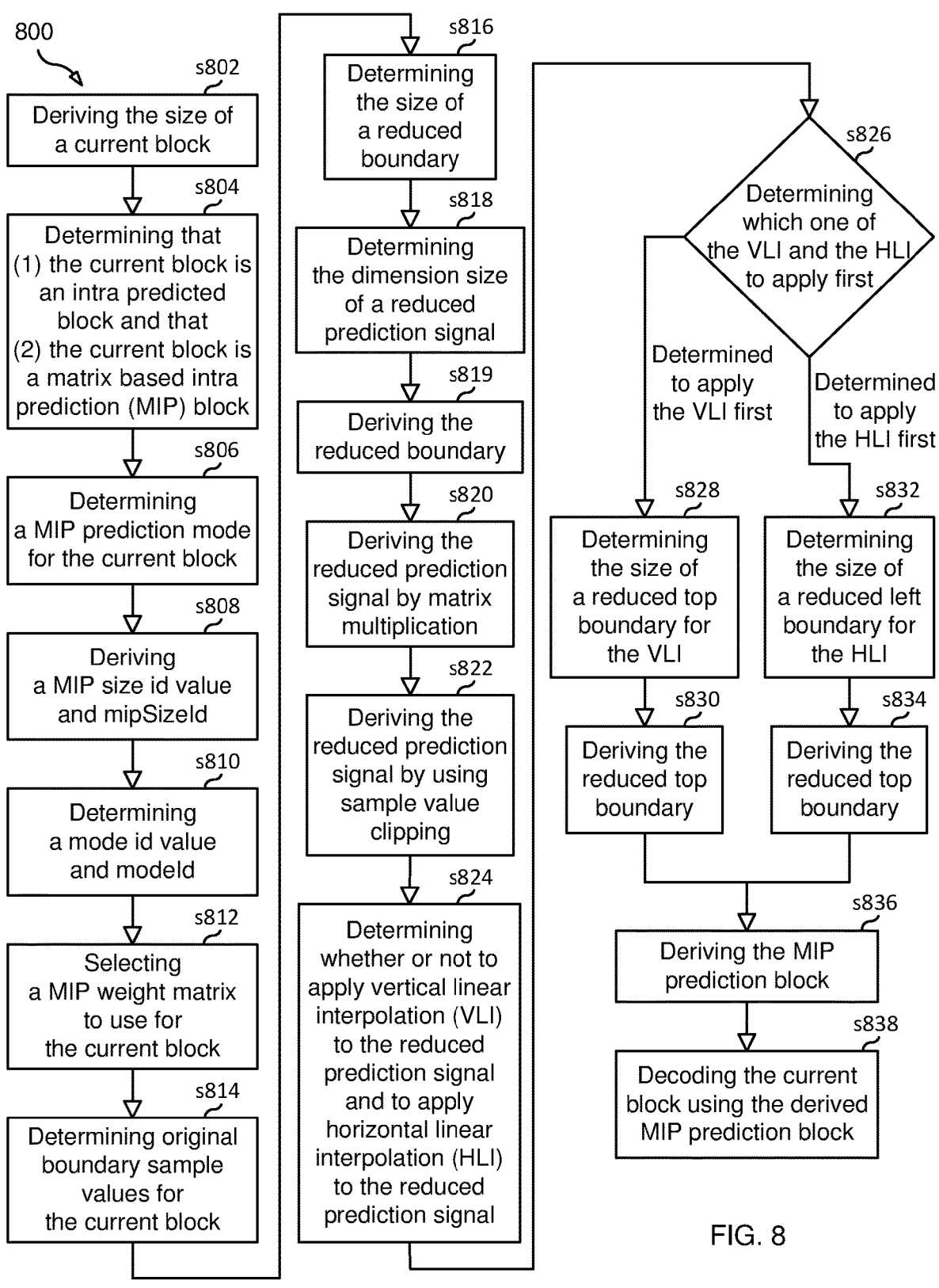
FIG. 8 is a flowchart illustrating a process according to an embodiment.

The processes described herein can be applied in an encoder and/or decoder of a video or image coding system. For example, a decoder may execute all or a subset of the following steps of process 800 (see FIG. 8) to decode an intra predicted block in a picture of a coded video bitstream.

Step s802 comprises deriving the size of the current block as a width value W and height value H by decoding syntax elements in the bitstream.

Step s804 comprises determining, based on elements in the coded bitstream, that the current block is an intra predicted block and that the current block is a matrix based intra prediction (MIP) block.

Step s806 comprises determining a MIP prediction mode for the current block from decoding elements in the bitstream.

Step s808 comprises deriving a MIP size id value, mipSizeId, from the width W and the height H. For example, step s808 in one embodiment comprises computing A=W×H and then determining whether A is less than 32. If A is less than 32 (or equal to or less than 16), then mipSizeId is set equal to 0, otherwise it is determined whether A is less than 128 (or equal to or less than 64). If A is less than 128, then mipSizeId is set to 1; otherwise mipSizeId is set to 2.

Steps s810 comprises determining a mode id value, modeId, based on the determined MIP prediction mode and mipSizeId.

Step s812 comprises selecting a MIP weight matrix to use for the current block, wherein the matrix is selected based on the value of modeId and the value of mipSizeId. For example, a MIP weight matrix look-up table that maps different mipSizeId-modeId pairs to different MIP weight matrices can be used to select the MIP weight matrix that corresponds to the mipSizeId-modeId pair.

Step s814 comprises determining the original boundary sample values for the current block. The original boundary samples are W samples from the nearest neighbouring samples to the above of the current block and H samples from the nearest neighbouring samples to the left of the current block.

Step s816 comprises determining the size of the reduced boundary $bdry_{red}$ based on the mipSizeId value of the current block.

Step s818 comprises determining the dimension size of the reduced prediction signal $pred_{red}$ based on the mipSizeId value of the current block.

Step s819 comprises deriving the reduced boundary $bdry_{red}$ from the original boundary samples.

Step s820 comprises deriving the reduced prediction signal $pred_{red}^{temp}$ by matrix multiplication of the MIP weight matrix and the reduced boundary $bdry_{red}$.

Step s822 comprises deriving the reduced prediction signal $pred_{red}$ by using sample value clipping on each sample of the $pred_{red}^{temp}$.

Step s824 comprises determining whether or not to i) apply vertical linear interpolation to the reduced prediction signal $pred_{red}$ based on the width W and the height H of the current block and ii) apply horizontal linear interpolation to the reduced prediction signal $pred_{red}$ based on the width W and the height H of the current block. If the decision is to apply both vertical and horizontal linear interpolation, then process 800 proceeds to step s826.

Step s826 comprises determining, based on the width W and the height H of the current block, whether to apply vertical linear interpolation before horizontal linear interpolation or to apply horizontal linear interpolation before vertical linear interpolation.

If the decision is to first apply vertical linear interpolation, then process 800 proceeds to step s828, otherwise it proceeds to step 832.

Step s828 comprises determining the size of the reduced top boundary $bdry_{redII}^{top}$ for the vertical linear interpolation based on the width W and the height H of the current block. Step s830 comprises deriving the reduced top boundary $bdry_{red}^{top}$ from the original top boundary samples.

Step s832 comprises determining the size of the reduced left boundary $bdry_{redII}^{left}$ for the horizontal linear interpolation based on the width W and the height H of the current block. Step s834 comprises deriving the reduced left boundary $bdry_{redII}^{left}$ from the original left boundary samples.

Step s836 comprises deriving the MIP prediction block pred by generating the sample values at the remaining positions by using linear interpolation.

Step s838 comprises decoding the current block by using the derived MIP prediction block.

Example of Changes to the Current VVC Draft Text

Below are proposed changes to the current VVC draft text (ref JVET-O2001-vE) for the MIP process for one embodiment. Text between the characters "[[" and "]]" is to be deleted and underlined text is to be added.

8.4 Decoding Process for Coding Units Coded in Intra Prediction Mode 8.4.1 General Decoding Process for Coding Units Coded in Intra Prediction Mode Inputs to this process are:

a luma location (xCb, yCb) specifying the top-left sample
        of the current coding block relative to the top-left luma
        sample of the current picture,
    a variable cbWidth specifying the width of the current
        coding block in luma samples,
    a variable cbHeight specifying the height of the current
        coding block in luma samples,
    a variable treeType specifying whether a single or a dual
        tree is used and if a dual tree is used, it specifies
        whether the current tree corresponds to the luma or
        chroma components.

Output of this process is a modified reconstructed picture before in-loop filtering.

The derivation process for quantization parameters as specified in clause 8.7.1 is invoked with the luma location (xCb, yCb), the width of the current coding block in luma samples cbWidth and the height of the current coding block in luma samples cbHeight, and the variable treeType as inputs. When treeType is equal to SINGLE_TREE or treeType is equal to DUAL_TREE_LUMA, the decoding process for luma samples is specified as follows:

If pred_mode_plt_flag is equal to 1, the following applies:
        The general decoding process for palette blocks as
            specified in clause 8.4.5.3 is invoked with the luma
            location (xCb, yCb), the variable startComp set equal
            to 0, the variable cIdx set to 0, the variable nCbW set
            equal to cbWidth, the variable nCbH set equal to
            cbHeight.
    Otherwise (pred_mode_plt_flag is equal to 0), the follow-
        ing applies:
        1. The variable mipSizeId[x][y] for x=xCb..xCb+cb-
            Width−1 and y=yCb..yCb+cbHeight−1 is derived as
            follows:

If both cbWidth and cbHeight are equal to 4, mipSizeId[x][y] is set equal to 0.

Otherwise, if (cbWidth*cbHeight) is less than or equal to 64, mipSizeId[x][y] is set equal to 1.

Otherwise, mipSizeId[x][y] is set equal to 2.

2. The luma intra prediction mode is derived as follows:

If intra_mip_flag[xCb][yCb] is equal to 1, IntraPredModeY[x][y] with x=xCb..xCb+cbWidth−1 and y=yCb..yCb+cbHeight−1 is set to be equal to intra_mip_mode[xCb][yCb].

Otherwise, the derivation process for the luma intra prediction mode as specified in clause 8.4.2 is invoked with the luma location (xCb, yCb), the width of the current coding block in luma samples cbWidth and the height of the current coding block in luma samples cbHeight as input.

3. The variable predModeIntra is set equal to IntraPredModeY[xCb][yCb].

The general decoding process for intra blocks as specified in clause 8.4.5.1 is invoked with the sample location (xTb0, yTb0) set equal to the luma location (xCb, yCb), the variable nTbW set equal to cbWidth, the variable nTbH set equal to cbHeight, predModeIntra, and the variable cIdx set equal to 0 as inputs, and the output is a modified reconstructed picture before in-loop filtering.

8.4.5.2.1 Matrix-Based Intra Sample Prediction

Inputs to this process are:

a sample location (xTbCmp, yTbCmp) specifying the top-left sample of the current transform block relative to the top-left sample of the current picture, a variable predModeIntra specifying the intra prediction mode, a variable nTbW specifying the transform block width, a variable nTbH specifying the transform block height.

Outputs of this process are the predicted samples predSamples[x][y], with x=0..nTbW−1, y=0..nTbH−1.

Variables numModes, boundarySize, predW, predH and predC are derived using mipSizeId[xTbCmp][yTbCmp] as specified in Table 8-4.

TABLE 8-4

Specification of number of prediction modes numModes, boundary size boundarySize, and prediction sizes predW, predH and predC using mipSizeId

| mipSizeId | numModes | boundarySize | predW | predH | predC |
|---|---|---|---|---|---|
| 0 | 35 | 2 | 4 | 4 | 4 |
| 1 | 19 | 4 | 4 | 4 | 4 |
| 2 | 11 | 4 | [[Min(nTbW, 8)]] 8 | [[Min(nTbH, 8)]] 8 | 8 |

The flag isTransposed is derived as follows:

isTransposed=(predModeIntra>(numModes/2))?TRUE:FALSE (8-55)

The variable inSize is derived as follows:

inSize=(2*boundarySize)−(mipSizeId[xTbCmp][yTbCmp]==2)?1:0 (8-56)

For the generation of the reference samples refT[x] with x=0..nTbW−1 and refL[y] with y=0..nTbH−1, the following applies:

The reference sample availability marking process as specified in clause 8.4.5.2.7 is invoked with the sample location (xTbCmp, yTbCmp), reference line index equal to 0, the reference sample width nTbW, the reference sample height nTbH, colour component index equal to 0 as inputs, and the reference samples refUnfilt[x][y] with x=−1, y=−1..nTbH−1 and x=0..nTbW−1, y=−1 as output.

When at least one sample refUnfilt[x][y] with x=−1, y=−1.. nTbH−1 and x=0.. nTbW−1, y=−1 is marked as "not available for intra prediction", the reference sample substitution process as specified in clause 8.4.5.2.8 is invoked with reference line index 0, the reference sample width nTbW, the reference sample height nTbH, the reference samples refUnfilt[x][y] with x=−1, y=−1..nTbH−1 and x=0..nTbW−1, y=−1, and colour component index 0 as inputs, and the modified reference samples refUnfilt[x][y] with x=−1, y=−1..nTbH−1 and x=0..nTbW−1, y=−1 as output.

The reference samples refT[x] with x=0..nTbW−1 and refL[y] with y=0..nTbH−1 are assigned as follows:

refT[x]=refUnfilt[x][−1](8-59)

refL[y]=refUnfilt[−1][y](8-60)

For the generation of the input samples p[x] with x=0..2*inSize−1, the following applies:

The MIP boundary downsampling process as specified in clause 8.4.5.2.2 is invoked for the top reference samples with the block size nTbW, the reference samples refT[x] with x=0..nTbW−1, and the boundary size boundarySize as inputs, and reduced boundary samples redT[x] with x=0..boundarySize−1 as outputs.

The MIP boundary downsampling process as specified in clause 8.4.5.2.2 is invoked for the left reference samples with the block size nTbH, the reference samples refL[y] with y=0..nTbH−1, and the boundary size boundarySize as inputs, and reduced boundary samples redL[x] with x=0..boundarySize−1 as outputs.

The reduced top and left boundary samples redT and redL are assigned to the boundary sample array pTemp[x] with x=0..2*boundarySize−1 as follows:

If isTransposed is equal to 1, pTemp[x] is set equal to redL[x] with x=0..boundarySize−1 and pTemp[x+boundarySize] is set equal to redT[x] with x=0..boundarySize−1.

Otherwise, pTemp[x] is set equal to redT[x] with x=0..boundarySize−1 and pTemp[x+boundarySize] is set equal to redL[x] with x=0..boundarySize−1.

The input values p[x] with x=0.. inSize−1 are derived as follows:

If mipSizeId[xTbCmp][yTbCmp] is equal to 2, the following applies:

p[x]=pTemp[x+1]−pTemp[0](8-61)

Otherwise (mipSizeId[xTbCmp][yTbCmp] is less than 2), the following applies:

p[0]=pTemp[0]−(1<<(BitDepthy−1))

p[x]=pTemp[x]−pTemp[0] for x=1.. inSize−1 (8-62)

For the intra sample prediction process according to predModeIntra, the following ordered steps apply:

1. The matrix-based intra prediction samples predMip[x][y], with x=0..predW−1, y=0..predH−1 are derived as follows:

The variable modeld is derived as follows:

modeld=predModeIntra−(isTransposed?numModes/2:0) (8-63)

The weight matrix mWeight[x][y] with x=0.2*inSize−1, y=0..predC*predC−1 is derived by invoking the MIP weight matrix derivation process as specified in clause 8.4.5.2.3 with mipSizeId[xTbCmp][yTbCmp] and modeld as inputs.

The variable sW is derived using mipSizeId[xTbCmp][yTbCmp] and modeld as specified in Table 8-5.

The variable sO is derived using mipSizeId[xTbCmp][yTbCmp] and modeld as specified in Table 8-6.

The matrix-based intra prediction samples predMip[x][y], with x=0..predW−1, y=0..predH−1 are derived as follows:

$$oW = (1 \ll (sW - 1)) - fO * \left( \sum\nolimits_{i=0}^{inSize-1} p[i] \right) \quad (8\text{-}64)$$

$$[[incW = (predC > mipW)?2:1 \quad (8\text{-}65)$$

$$incH = (predC > mipH)?2:1 \quad (8\text{-}66)$$

$$predMip[x][y] =$$

$$\left( \left( \left( \sum\nolimits_{i=0}^{inSize-1} mWeight[i][y * incH * predC + x * incW] * p[i] \right) + oW \right) \gg$$

$$sW \right) + pTemp[0](8\text{-}67)]]$$

$$predMip[x][y] = \left( \left( \left( \sum\nolimits_{i=0}^{inSize-1} mWeight[i][y * predC + x] * p[i] + \quad (8\text{-}67)$$

$$oW \right) \gg sW) + pTemp[0]$$

2. The matrix-based intra prediction samples predMip[x][y], with x=0..predW−1, y=0..predH−1 are clipped as follows:

predMip[x][y]=Cliply(predMip[x][y]) (8-68)

3. When isTransposed is equal to TRUE, the predH x predW array predMip[x][y] with x=0..predH−1, y=0..predW−1 is transposed as follows:

predTemp[y][x]=predMip[x][y](8-69)
predMip=predTemp (8-70)

4. The predicted samples predSamples[x][y], with x=0..nTbW−1, y=0..nTbH−1 are derived as follows:

If nTbW is greater than predW or nTbH is greater than predH, the MIP prediction upsampling process as specified in clause 8.4.5.2.4 is invoked with the input block width predW, the input block height predH, matrix-based intra prediction samples predMip[x][y] with x=0..predW−1, y=0..predH−1, the transform block width nTbW, the transform block height nTbH, the top reference samples refT[x] with x=0..nTbW−1, and the left reference samples refL[y] with y=0..nTbH−1 as inputs, and the output is the predicted sample array predSamples.

Otherwise, predSamples[x][y], with x=0..nTbW−1, y=0..nTbH−1 is set equal to predMip[x][y].

In some embodiments, the MIP weight matrix look-up table is not identical to the current version of VVC. In this embodiment, the mipSizeId values are associated with a different set of numModes values. In one example, the number of MIP prediction modes will reduce the number of matrices in look-up table which can reduce the memory usage of a codec. Increase the number of MIP prediction modes will increase the number of MIP weight matrices in look-up table which can improve the prediction accuracy.

Another example is that the matrix element values can be updated by re-training the MIP matrix models used for group 1 when 4×16 and 16×4 also belong to that group, group 2 without 4×16 and 16×4. The MIP matrices when the Mip-SizeId is equal to 1 in the current VVC was trained by using the block shapes 8×4, 4×8 and 8×8. A more proper way (or more consistent training) may carry out by using the block shapes 8×4, 4×8, 8×8, 4×16 and 16×4 in the matrix training process to derive the matrices when MipSizeId is equal to 1.

In another embodiment, MIP is not applied for 4×16 and 16×4 blocks, e.g. for blocks where the sum of the dimensions is equal to 20.

In another embodiment, for blocks where W=16 and H=4, the conventional way to determine mipSizeId is used (i.e., mipSizeId is set equal to 2), but for blocks where W=4 and H=16, mipSizeId is determined as explained with respect to steps s706 (i.e., mipSizeId is set equal to 1).

In another embodiment, for blocks where W=4 and H=16, the conventional way to determine mipSizeId is used (i.e., mipSizeId is set equal to 2), but for blocks where W=16 and H=4, mipSizeId is determined as explained with respect to steps s706 (i.e., mipSizeId is set equal to 1).

Figure 9:
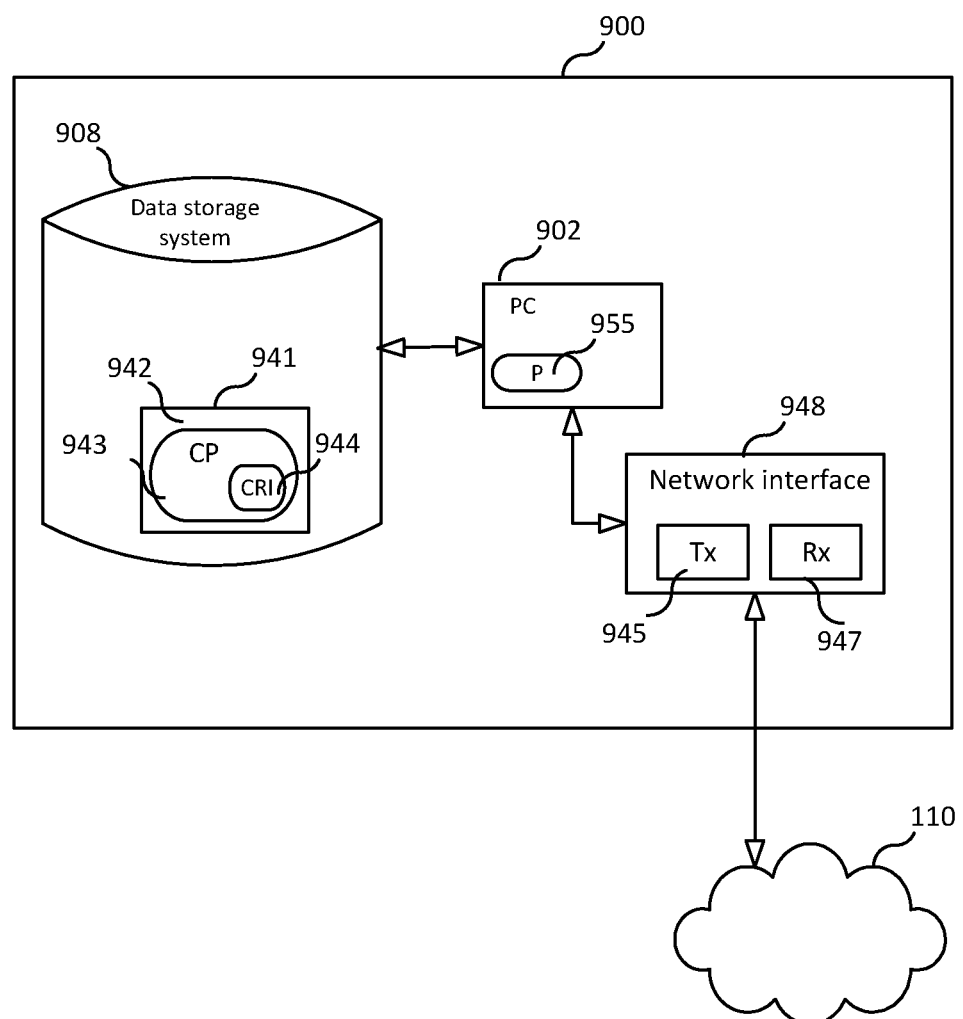
FIG. 9 is a block diagram of an apparatus according to an embodiment.

FIG. 9 is a block diagram of an apparatus 900, according to some embodiments, for implementing the video encoder 102 or the video decoder 104. As shown in FIG. 9, apparatus 900 may comprise: processing circuitry (PC) 902, which may include one or more processors (P) 955 (e.g., a general purpose microprocessor and/or one or more other processors, such as an application specific integrated circuit (ASIC), field-programmable gate arrays (FPGAs), and the like), which processors may be co-located in a single housing or in a single data center or may be geographically distributed (i.e., apparatus 900 may be a distributed computing apparatus); a network interface 948 comprising a transmitter (Tx) 945 and a receiver (Rx) 947 for enabling apparatus 900 to transmit data to and receive data from other nodes connected to a network 110 (e.g., an Internet Protocol (IP) network) to which network interface 948 is connected (directly or indirectly) (e.g., network interface 948 may be wirelessly connected to the network 110, in which case network interface 948 is connected to an antenna arrangement); and a local storage unit (a.k.a., "data storage system") 908, which may include one or more non-volatile storage devices and/or one or more volatile storage devices. In embodiments where PC 902 includes a programmable processor, a computer program product (CPP) 941 may be provided. CPP 941 includes a computer readable medium (CRM) 942 storing a computer program (CP) 943 comprising computer readable instructions (CRI) 944. CRM 942 may be a non-transitory computer readable medium, such as, magnetic media (e.g., a hard disk), optical media, memory devices (e.g., random access memory, flash memory), and the like. In some embodiments, the CRI 944 of computer program 943 is configured such that when executed by PC 902, the CRI causes apparatus 900 to perform steps described herein (e.g., steps described herein with reference to the flow charts). In other embodiments, apparatus 900 may be configured to perform steps described herein without the need for code. That is, for example, PC 902 may consist merely of one or more ASICs. Hence, the features of the embodiments described herein may be implemented in hardware and/or software.

Figure 10:
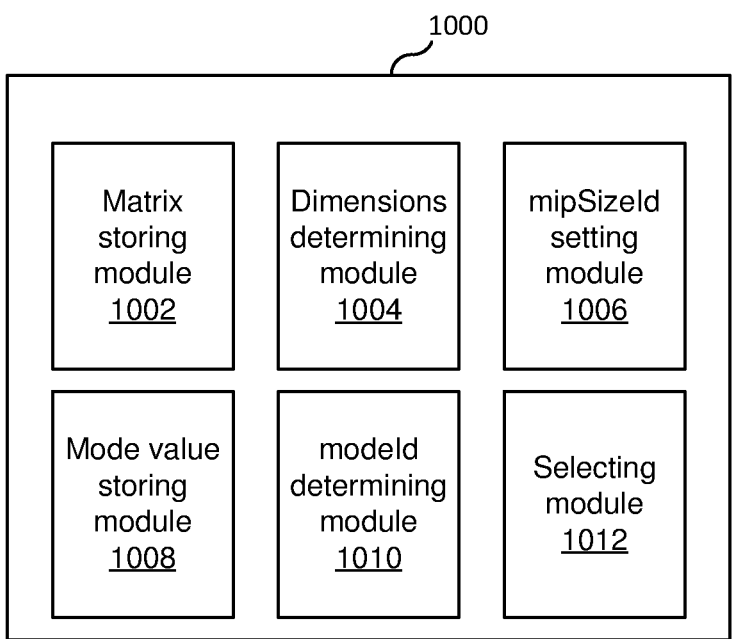
FIG. 10 is a block diagram of an apparatus according to an embodiment.

FIG. 10 illustrates functional units of an apparatus 1000 according to an embodiment.

SUMMARY OF VARIOUS EMBODIMENTS

A1. A matrix based intra prediction, MIP, method for predicting samples of a current block, the method comprising: storing a set of MIP weight matrices; determining the width (W) and the height (H) of the current block; setting a mipSizeId variable to a certain value based on W and H, wherein setting mipSizeId to a certain value comprises setting mipSizeId to 1 as a result of determining that a condition is true, wherein determining that the condition is true comprises determining that W×H is greater than T1 (e.g., 16) but less than or equal to T2 (e.g., 64); storing a value, predModeIntra, that specifies a MIP prediction mode for the current block; determining, based on predModeIntra and mipSizeId, a modeId value; and selecting, from the set of MIP weight matrices, a MIP weight matrix to be used for the current block, wherein the selection is based on modeId and mipSizeId.

A2. The method of embodiment A1, further comprising storing a look-up table that maps different mipSizeId-modeId pairs to different MIP weight matrices, wherein selecting the MIP weight matrix comprises using the look-up table to select the MIP weight matrix.

A3. The method of embodiment A1 or A2, wherein determining that W×H is greater than T1 (e.g., 16) but less than or equal to T2 (e.g., 64) comprises: i) determining that W=16 and H=4 or ii) determining that W=4 and H=16.

A4. The method of any one of embodiments A1-A3, wherein setting mipSizeId to the certain value comprises setting mipSizeId to 1 as a result of i) determining that W=4 and H=16 or ii) determining that W=16 and H=4.

A5. The method of any one of embodiments A1-A4, wherein setting mipSizeId to the certain value comprises setting mipSizeId to 2 as a result of determining that W×H is greater than T2.

A6. The method of any one of embodiments A1-A5, further comprising determining original boundary sample values for the current block, wherein the original boundary samples are W samples from the nearest neighbouring samples to the above of the current block and H samples from the nearest neighbouring samples to the left of the current block.

A7. The method of embodiment A6, further comprising: determining the size of a reduced boundary $bdry_{red}$ based on the mipSizeId value of the current block; determining a dimension size of a reduced prediction signal $pred_{red}$ based on the mipSizeId value of the current block; deriving the reduced boundary $bdry_{red}$ from the original boundary samples; deriving the reduced prediction signal $pred_{red}^{temp}$ by matrix multiplication of the selected MIP weight matrix and the reduced boundary $bdry_{red}$; and deriving the reduced prediction signal $pred_{red}$ by using sample value clipping on each sample of the $pred_{red}^{temp}$.

A8. The method of embodiment A7, further comprising: determining whether or not to i) apply vertical linear interpolation to the reduced prediction signal $pred_{red}$ based on the width W and the height H of the current block and ii) apply horizontal linear interpolation to the reduced prediction signal $pred_{red}$ based on the width W and the height H of the current block.

A9. The method of embodiment A8, further comprising: as a result of determining to apply both vertical and horizontal linear interpolation, determining, based on the width W and the height H of the current block, whether to apply vertical linear interpolation before horizontal linear interpolation or to apply horizontal linear interpolation before vertical linear interpolation.

A10. The method of embodiment A9, further comprising: as a result of determining to apply vertical linear interpolation before horizontal linear interpolation, determining the size of the reduced top boundary $bdry_{redII}^{top}$ for the vertical linear interpolation based on the width W and the height H of the current block.

A11. The method of embodiment A10, further comprising deriving the reduced top boundary $bdry_{redII}^{top}$ from the original top boundary samples.

A12. The method of embodiment A9, further comprising: as a result of determining to apply horizontal linear interpolation before vertical linear interpolation, determining the size of the reduced left boundary $bdry_{redII}^{left}$ for the horizontal linear interpolation based on the width W and the height H of the current block.

A13. The method of embodiment A12, further comprising deriving the reduced left boundary $bdry_{redII}^{left}$ from the original left boundary samples.

A14. The method of embodiment A11 or A13, further comprising: deriving the MIP prediction block pred by generating the sample values at the remaining positions by using linear interpolation; and decoding the current block by using the derived MIP prediction block.

B1. A matrix based intra prediction, MIP, method (700) for predicting samples of a current block, the method comprising: storing (s702) a set of MIP weight matrices; determining (s704) the width, W, and the height, H, of the current block; setting (s706) a mipSizeId variable to 1 as a result of: i) determining that W=4 and H=16 or ii) determining that W=16 and H=4; storing (s708) a value, predModeIntra, that specifies a MIP prediction mode for the current block; determining (s710), based on predModeIntra and the value of the mipSizeId variable, a modeId value; and selecting (s712), from the set of MIP weight matrices, a MIP weight matrix to be used for the current block, wherein the selection is based on modeId and the value of the mipSizeId variable.

B2. The method of claim B1, further comprising storing a look-up table that maps different mipSizeId-modeId pairs to different MIP weight matrices, wherein selecting the MIP weight matrix comprises using the look-up table to select the MIP weight matrix.

B3. The method of claim B1 or B2, further comprising determining original boundary sample values for the current block, wherein the original boundary samples are W samples from the nearest neighbouring samples to the above of the current block and H samples from the nearest neighbouring samples to the left of the current block.

B4. The method of claim B3, further comprising: determining the size of a reduced boundary $bdry_{red}$ based on the mipSizeId value of the current block; determining a dimension size of a reduced prediction signal $pred_{red}$ based on the mipSizeId value of the current block; deriving the reduced boundary $bdry_{red}$ from the original boundary samples; deriving the reduced prediction signal $pred_{red}^{temp}$ by matrix multiplication of the selected MIP weight matrix and the reduced boundary $bdry_{red}$; and deriving the reduced prediction signal $pred_{red}$ by using sample value clipping on each sample of the $pred_{red}^{temp}$.

B5. The method of claim B4, further comprising: determining whether or not to i) apply vertical linear interpolation to the reduced prediction signal $pred_{red}$ based on the width W and the height H of the current block and ii) apply horizontal linear interpolation to the reduced prediction signal $\text{pred}_{red}$ based on the width W and the height H of the current block.

B6. The method of claim B5, further comprising: as a result of determining to apply both vertical and horizontal linear interpolation, determining, based on the width W and the height H of the current block, whether to apply vertical linear interpolation before horizontal linear interpolation or to apply horizontal linear interpolation before vertical linear interpolation.

B7. The method of claim B6, further comprising: as a result of determining to apply vertical linear interpolation before horizontal linear interpolation, determining the size of the reduced top boundary $\text{bdry}_{redII}^{top}$ for the vertical linear interpolation based on the width W and the height H of the current block.

B8. The method of claim B7, further comprising deriving the reduced top boundary $\text{bdry}_{redII}^{top}$ from the original top boundary samples.

B9. The method of claim B6, further comprising: as a result of determining to apply horizontal linear interpolation before vertical linear interpolation, determining the size of the reduced left boundary $\text{bdry}_{redII}^{left}$ for the horizontal linear interpolation based on the width W and the height H of the current block.

B10. The method of claim B9, further comprising deriving the reduced left boundary $\text{bdry}_{redII}^{left}$ from the original left boundary samples.

B11. The method of claim B8 or B10, further comprising: deriving the MIP prediction block pred by generating the sample values at the remaining positions by using linear interpolation; and decoding the current block by using the derived MIP prediction block.

B12. The method of any one of claims B1-B11, further comprising: determining a dimension size of a reduced prediction signal $\text{pred}_{red}$ based on the mipSizeId value of the current block.

B13. The method of claim B12, further comprising: deriving a reduced prediction signal $\text{pred}_{red}^{temp}$ by matrix multiplication of the selected MIP weight matrix and a reduced boundary $\text{bdry}_{red}$; and deriving the reduced prediction signal $\text{pred}_{red}$ by using sample value clipping on each sample of the $\text{pred}_{red}^{temp}$.

C1. A computer program (943) comprising instructions (944) which when executed by processing circuitry (902) causes the processing circuitry (902) to perform the method of any one of the above embodiments A1-A14 or B1-B13.

C2. A carrier containing the computer program of embodiment C1, wherein the carrier is one of an electronic signal, an optical signal, a radio signal, and a computer readable storage medium (942).

D1. An apparatus (900) adapted to perform the method of any one of embodiments A1-A14.

E1. An apparatus (1000, see FIG. 10) for matrix based intra prediction, MIP, the apparatus comprising: a matrix storing module (1002) for storing a set of MIP weight matrices; a dimensions determining module (1004) for determining the width (W) and the height (H) of the current block; a mipSizeId setting module (1006) for setting a mipSizeId variable to a certain value based on W and H, wherein setting mipSizeId to a certain value comprises setting mipSizeId to 1 as a result of determining that a condition is true, wherein determining that the condition is true comprises determining that W×H is greater than T1 (e.g., 16) but less than or equal to T2 (e.g., 64); a mode value storing module (1008) for storing a value, predModeIntra, that specifies a MIP prediction mode for the current block;

a modeId determining module (1010) for determining, based on predModeIntra and mipSizeId, a modeId value; and a selecting module (1012) for selecting, from the set of MIP weight matrices, a MIP weight matrix to be used for the current block, wherein the selection is based on modeId and mipSizeId.

Advantages

As noted above, an advantage of the embodiments is to reduce the coding complexity of the MIP process, and this is done by eliminating the handling of matrix multiplication with a MIP weight matrix, mWeight[M][N], where M is greater than the size of MIP OUTPUT. The simplification aligns the matrix multiplication process for all MIP coded blocks. An example in VVC has been implemented using the VTM-6.0 reference VVC software. Compared to the current version of VVC, given a 16×4 or 4×16 block, the mipSizeId is set to 1, where in the current version of VVC, the mipSizeId is set to 2 for this case. The proposed method has negligible coding efficiency impact compared to VTM6.0. The BD-rate result is as follows:

| | All Intra Over VTM-6.0 (host timing without MD5) | | | | |
|---|---|---|---|---|---|
| | Y | U | V | EncT | DecT |
| Class A1 | 0.01% | −0.01% | −0.01% | 104% | 99% |
| Class A2 | 0.02% | 0.02% | 0.01% | 101% | 102% |
| Class B | 0.01% | −0.01% | 0.00% | 100% | 99% |
| Class C | 0.02% | −0.05% | 0.06% | 100% | 98% |
| Class E | 0.01% | −0.02% | 0.06% | 100% | 100% |
| Overall | 0.01% | −0.01% | 0.02% | 101% | 100% |
| Class D | 0.02% | 0.01% | 0.05% | 100% | 101% |
| Class F | 0.01% | −0.01% | −0.11% | 100% | 99% |

Abbreviations

ALF Adaptive Loop Filter
APS Adaptation Parameter Set
AUD Access Unit Delimiter
BLA Broken Link Access
CRA Clean Random Access
CVS Coded Video Sequence
CVSS CVS Start
CU Coding Unit
DPS Decoder Parameter Set
GRA Gradual Random Access
HEVC High-efficiency Video Coding
IDR Instantaneous Decoding Refresh
TRAP Intra Random Access Point
JVET Joint Video Exploratory Team
LMCS Luma Mapping and Chroma Scaling
MPEG Motion Picture Experts Group
NAL Network Abstraction Layer
PES Packetized Elementary Stream
PPS Picture Parameter Set
RADL Random Access Decodable Leading
RASL Random Access Skip Leading
SPS Sequence Parameter Set
VCL Video Coding Layer
VPS Video Parameter Set
VVC Versatile Video Coding
SEI Supplemental Enhancement Layer While various embodiments are described herein (including the Appendix), it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

APPENDIX 8.4.5.2.3 MIP Weight Matrix Derivation Process

Inputs to this process are: a variable mipSizeId and a variable modeId.

Output of this process is the MIP weight matrix mWeight[x][y].

The MIP weight matrix mWeight[x][y] is derived depending on mipSizeId and modeId as follows:

---

If mipSizeId is equal to 0 and modeId is equal to 0, the following applies:
mWeight[x][y] = (8-73)
{
{37, 59, 77, 28}, {32, 92, 85, 25}, {31, 69, 100, 24}, {33, 36, 106, 29},
{24, 49, 104, 48}, {24, 21, 94, 59}, {29, 0, 80, 72}, {35, 2, 66, 84},
{32, 13, 35, 99}, {39, 11, 34, 103}, {45, 21, 34, 106}, {51, 24, 40, 105},
{50, 28, 43, 101}, {56, 32, 49, 101}, {61, 31, 53, 102}, {61, 32, 54, 100}
},
Otherwise, if mipSizeId is equal to 0 and modeId is equal to 1, the following applies:
mWeight[x][y] = (8-74)
{
{18, 16, 72, 2}, {16, 19, 55, 7}, {12, 72, 34, 14}, {0, 84, 13, 21},
{20, 19, 65, 54}, {18, 19, 48, 65}, {15, 23, 31, 73}, {10, 27, 18, 76},
{20, 21, 18, 87}, {19, 21, 19, 87}, {20, 20, 22, 85}, {20, 20, 25, 84},
{20, 21, 24, 82}, {20, 20, 24, 82}, {20, 22, 24, 82}, {19, 23, 24, 82}
},
Otherwise, if mipSizeId is equal to 0 and modeId is equal to 2, the following applies:
mWeight[x][y] = (8-75)
{
{8, 7, 62, 10}, {7, 0, 33, 9}, {7, 12, 2, 6}, {7, 63, 3, 6},
{7, 7, 73, 6}, {7, 8, 71, 9}, {7, 1, 50, 9}, {7, 9, 14, 7},
{8, 7, 55, 22}, {7, 7, 72, 5}, {7, 9, 74, 7}, {7, 3, 62, 9},
{6, 6, 2, 77}, {7, 6, 33, 45}, {7, 7, 62, 14}, {7, 8, 70, 8}
},
Otherwise, if mipSizeId is equal to 0 and modeId is equal to 3, the following applies:
mWeight[x][y] = (8-76)
{
{27, 27, 38, 28}, {27, 30, 28, 28}, {27, 58, 30, 26}, {26, 66, 31, 25},
{27, 26, 51, 27}, {27, 37, 39, 26}, {26, 64, 35, 26}, {21, 63, 30, 31},
{27, 26, 39, 47}, {19, 43, 30, 51}, {9, 56, 21, 54}, {5, 50, 15, 56},
{18, 27, 11, 72}, {5, 45, 13, 64}, {0, 48, 15, 59}, {2, 48, 15, 58}
},
Otherwise, if mipSizeId is equal to 0 and modeId is equal to 4, the following applies:
mWeight[x][y] = (8-77)
{
{27, 19, 44, 22}, {27, 35, 23, 27}, {28, 88, 29, 28}, {26, 91, 27, 27},
{22, 21, 87, 25}, {19, 22, 46, 20}, {22, 69, 26, 20}, {25, 87, 29, 23},
{22, 23, 40, 81}, {10, 16, 46, 66}, {1, 17, 17, 50}, {8, 37, 3, 40},
{23, 25, 21, 92}, {18, 24, 24, 91}, {11, 16, 23, 88}, {2, 11, 0, 81}
},
Otherwise, if mipSizeId is equal to 0 and modeId is equal to 5, the following applies:
mWeight[x][y] = (8-78)
{
{28, 28, 57, 29}, {28, 27, 54, 29}, {28, 32, 49, 28}, {28, 45, 44, 28},
{28, 29, 60, 27}, {28, 30, 60, 29}, {27, 29, 60, 29}, {28, 29, 59, 30},
{28, 29, 52, 36}, {28, 29, 58, 28}, {29, 30, 59, 27}, {27, 33, 57, 28},
{27, 28, 16, 71}, {27, 28, 23, 65}, {19, 29, 38, 47}, {0, 35, 54, 20}
},

---

-continued

Otherwise, if mipSizeId is equal to 0 and modeId is equal to 6, the following applies:
mWeight[x][y] = (8-79)
{
{57, 57, 83, 54}, {55, 55, 78, 53}, {56, 70, 70, 54}, {47, 97, 60, 52},
{56, 57, 82, 64}, {55, 56, 83, 62}, {54, 66, 80, 59}, {22, 79, 59, 43},
{56, 56, 60, 83}, {59, 58, 60, 86}, {38, 54, 58, 73}, {1, 62, 57, 35},
{55, 56, 55, 88}, {54, 54, 53, 89}, {17, 40, 47, 70}, {0, 60, 54, 38}
},
Otherwise, if mipSizeId is equal to 0 and modeId is equal to 7, the following applies:
mWeight[x][y] = (8-80)
{
{13, 10, 73, 12}, {13, 3, 54, 15}, {13, 0, 29, 14}, {13, 22, 13, 13},
{13, 13, 80, 10}, {12, 14, 86, 7}, {11, 11, 84, 8}, {12, 3, 68, 11},
{13, 12, 30, 59}, {12, 10, 45, 43}, {11, 11, 63, 26}, {9, 11, 75, 15},
{10, 10, 6, 83}, {8, 9, 6, 83}, {7, 8, 9, 78}, {2, 5, 21, 63}
},
Otherwise, if mipSizeId is equal to 0 and modeId is equal to 8, the following applies:
mWeight[x][y] = (8-81)
{
{47, 46, 72, 50}, {47, 45, 46, 57}, {46, 69, 38, 51}, {46, 80, 45, 49},
{47, 48, 58, 68}, {47, 45, 53, 72}, {47, 57, 40, 64}, {40, 76, 38, 50},
{47, 47, 52, 73}, {47, 47, 55, 72}, {47, 48, 51, 74}, {16, 56, 40, 51},
{46, 46, 54, 72}, {48, 48, 54, 72}, {39, 43, 53, 71}, {0, 35, 52, 51}
},
Otherwise, if mipSizeId is equal to 0 and modeId is equal to 9, the following applies:
mWeight[x][y] = (8-82)
{
{16, 39, 85, 0}, {15, 49, 42, 39}, {13, 30, 22, 66}, {13, 18, 19, 74},
{12, 19, 24, 73}, {13, 11, 13, 83}, {13, 12, 18, 78}, {13, 15, 19, 75},
{14, 15, 14, 78}, {14, 16, 19, 75}, {13, 17, 18, 75}, {12, 17, 18, 75},
{14, 16, 19, 75}, {13, 16, 18, 76}, {13, 16, 18, 76}, {12, 16, 19, 75}
},
Otherwise, if mipSizeId is equal to 0 and modeId is equal to 10, the following applies:
mWeight[x][y] = (8-83)
{
{41, 37, 70, 35}, {37, 27, 43, 37}, {39, 74, 38, 38}, {41, 113, 42, 40},
{38, 40, 105, 43}, {36, 32, 85, 38}, {27, 28, 50, 34}, {21, 83, 37, 31},
{38, 39, 43, 102}, {37, 39, 47, 100}, {26, 27, 40, 94}, {0, 25, 13, 78},
{38, 39, 37, 105}, {38, 40, 37, 105}, {39, 42, 40, 106}, {31, 35, 38, 102}
},
Otherwise, if mipSizeId is equal to 0 and modeId is equal to 11, the following applies:
mWeight[x][y] = (8-84)
{
{20, 20, 61, 8}, {15, 13, 36, 10}, {15, 15, 28, 12}, {19, 51, 25, 14},
{17, 19, 76, 39}, {12, 17, 61, 40}, {3, 7, 31, 42}, {0, 1, 4, 46},
{19, 20, 22, 85}, {18, 20, 22, 86}, {16, 21, 23, 85}, {13, 19, 17, 84},
{21, 21, 21, 84}, {21, 22, 22, 83}, {22, 22, 22, 84}, {22, 23, 23, 83}
},
Otherwise, if mipSizeId is equal to 0 and modeId is equal to 12, the following applies:
mWeight[x][y] = (8-85)
{
{16, 14, 75, 3}, {16, 43, 57, 16}, {14, 63, 20, 43}, {18, 46, 0, 65},
{17, 20, 54, 52}, {17, 22, 23, 76}, {19, 17, 15, 83}, {22, 17, 17, 82},
{18, 17, 11, 84}, {20, 18, 14, 83}, {21, 20, 16, 81}, {23, 21, 16, 81},
{20, 18, 18, 80}, {22, 19, 17, 81}, {23, 20, 16, 82}, {24, 20, 16, 82}
},
Otherwise, if mipSizeId is equal to 0 and modeId is equal to 13, the following applies:
mWeight[x][y] = (8-86)
{
{7, 6, 82, 0}, {7, 4, 83, 0}, {7, 2, 83, 0}, {7, 3, 80, 0},
{7, 8, 59, 16}, {7, 8, 58, 17}, {7, 8, 58, 17}, {7, 7, 57, 18},
{7, 7, 7, 70}, {7, 7, 7, 71}, {7, 7, 6, 71}, {7, 8, 7, 70},
{8, 7, 8, 71}, {8, 7, 8, 70}, {8, 7, 8, 70}, {8, 7, 9, 69}
},
Otherwise, if mipSizeId is equal to 0 and modeId is equal to 14, the following applies:
mWeight[x][y] = (8-87)
{
{44, 41, 64, 43}, {46, 60, 52, 42}, {46, 81, 42, 53}, {35, 71, 33, 65},
{48, 51, 72, 50}, {44, 65, 49, 65}, {24, 56, 34, 71}, {8, 38, 35, 66}, -continued {43, 50, 40, 80}, {16, 39, 37, 71}, {0, 28, 43, 61}, {2, 29, 44, 60},
{16, 33, 38, 71}, {0, 25, 44, 58}, {2, 26, 44, 60}, {4, 28, 43, 61}
},
Otherwise, if mipSizeId is equal to 0 and modeId is equal to 15, the
following applies:
mWeight[x][y] = (8-88)
{
{66, 86, 97, 69}, {66, 99, 93, 67}, {67, 100, 92, 68}, {66, 104, 90, 67},
{65, 94, 100, 63}, {68, 98, 94, 70}, {66, 99, 95, 67}, {65, 102, 94, 66},
{66, 86, 103, 67}, {62, 98, 101, 55}, {66, 101, 95, 66}, {65, 102, 95, 66},
{25, 69, 56, 123}, {0, 91, 94, 43}, {46, 100, 102, 50}, {65, 100, 97, 65}
},
Otherwise, if mipSizeId is equal to 0 and modeId is equal to 16, the
following applies:
mWeight[x][y] = (8-89)
{
{22, 20, 51, 22}, {21, 22, 51, 22}, {21, 29, 50, 22}, {21, 32, 48, 22},
{21, 23, 53, 22}, {21, 24, 53, 22}, {21, 23, 53, 22}, {21, 24, 53, 22},
{24, 24, 47, 28}, {24, 24, 48, 27}, {23, 25, 48, 26}, {22, 25, 48, 26},
{12, 16, 0, 71}, {7, 14, 1, 67}, {4, 14, 2, 64}, {4, 13, 4, 63}
},
Otherwise, if mipSizeId is equal to 0 and modeId is equal to 17, the
following applies:
mWeight[x][y] = (8-90)
{
{31, 29, 42, 33}, {29, 42, 11, 47}, {26, 63, 32, 31}, {30, 49, 48, 26},
{28, 30, 21, 56}, {12, 46, 14, 37}, {21, 52, 51, 18}, {31, 38, 53, 29},
{21, 37, 20, 52}, {0, 42, 39, 10}, {23, 38, 55, 22}, {32, 36, 52, 33},
{17, 45, 41, 27}, {8, 37, 48, 8}, {25, 33, 52, 27}, {31, 36, 52, 32}
},
Otherwise, if mipSizeId is equal to 1 and modeId is equal to 0, the
following applies:
mWeight[x][y] = (8-91)
{
{16, 22, 18, 20, 72, 43, 9, 19}, {16, 8, 22, 26, 56, 58, 5, 20},
{15, 21, 10, 35, 35, 72, 3, 20}, {13, 21, 21, 29, 18, 78, 7, 18},
{15, 16, 16, 19, 3, 70, 46, 8}, {13, 18, 15, 20, 4, 58, 61, 4},
{9, 16, 18, 18, 8, 42, 73, 3}, {6, 14, 20, 18, 13, 30, 76, 6},
{14, 18, 17, 17, 19, 4, 69, 40}, {10, 18, 17, 16, 19, 3, 55, 51},
{4, 14, 18, 15, 17, 5, 39, 63}, {3, 14, 18, 16, 16, 8, 28, 70},
{12, 15, 18, 16, 16, 20, 2, 92}, {8, 14, 18, 15, 15, 19, 0, 91},
{5, 15, 18, 16, 14, 19, 3, 88}, {5, 16, 17, 17, 15, 17, 7, 84}
},
Otherwise, if mipSizeId is equal to 1 and modeId is equal to 1, the
following applies:
mWeight[x][y] = (8-92)
{
{20, 35, 18, 20, 58, 35, 18, 20}, {20, 75, 26, 19, 32, 31, 20, 20},
{19, 6, 93, 22, 20, 25, 21, 20}, {16, 25, 0, 99, 18, 21, 21, 18},
{20, 28, 20, 20, 8, 78, 30, 19}, {20, 67, 22, 20, 10, 59, 27, 19},
{18, 7, 93, 18, 15, 30, 25, 20}, {14, 25, 1, 97, 20, 18, 22, 18},
{20, 28, 19, 20, 15, 14, 81, 25}, {20, 59, 20, 20, 12, 22, 65, 23},
{17, 7, 93, 16, 14, 24, 34, 22}, {10, 24, 3, 95, 19, 20, 20, 18},
{20, 29, 20, 20, 14, 23, 8, 90}, {20, 51, 19, 21, 14, 19, 15, 77},
{16, 7, 88, 16, 14, 20, 21, 43}, {7, 22, 6, 91, 19, 18, 20, 21}
},
Otherwise, if mipSizeId is equal to 1 and modeId is equal to 2, the
following applies:
mWeight[x][y] = (8-93)
{
{12, 19, 10, 12, 81, 14, 10, 11}, {12, 26, 15, 10, 79, 6, 12, 11},
{11, 16, 31, 12, 69, 2, 14, 10}, {11, 13, 8, 44, 54, 3, 14, 10},
{11, 11, 12, 11, 1, 83, 13, 9}, {11, 12, 12, 12, 11, 83, 4, 12},
{11, 15, 11, 13, 24, 77, 0, 12}, {11, 14, 13, 16, 38, 63, 2, 12},
{11, 12, 11, 11, 14, 2, 82, 12}, {11, 13, 12, 12, 10, 14, 79, 5},
{11, 12, 12, 13, 6, 29, 70, 3}, {11, 12, 11, 16, 3, 45, 55, 4},
{11, 12, 11, 12, 10, 12, 1, 84}, {11, 13, 11, 12, 12, 8, 13, 76},
{11, 12, 12, 13, 14, 3, 29, 64}, {11, 13, 10, 17, 15, 0, 45, 49}
},
Otherwise, if mipSizeId is equal to 1 and modeId is equal to 3, the
following applies:
mWeight[x][y] = (8-94)
{
{45, 74, 48, 44, 43, 62, 46, 48}, {44, 77, 65, 47, 38, 46, 51, 51},
{44, 46, 90, 61, 43, 41, 49, 52}, {39, 43, 36, 116, 43, 42, 45, 52},
{45, 75, 49, 44, 43, 47, 72, 51}, {45, 65, 72, 48, 41, 35, 60, 61},
{42, 41, 82, 67, 38, 41, 47, 63}, {27, 46, 28, 115, 39, 44, 40, 57},
{46, 68, 51, 45, 40, 44, 59, 78}, {44, 55, 77, 48, 37, 43, 45, 79},
{36, 38, 71, 74, 34, 44, 40, 72}, {9, 52, 24, 106, 43, 38, 42, 54}, -continued {44, 58, 54, 45, 39, 46, 45, 94}, {42, 46, 76, 50, 36, 48, 40, 85},
{28, 41, 57, 80, 38, 42, 40, 73}, {0, 56, 24, 99, 50, 28, 46, 54}
},
Otherwise, if mipSizeId is equal to 1 and modeId is equal to 4, the
following applies:
mWeight[x][y] = (8-95)
{
{16, 32, 15, 16, 60, 34, 10, 19}, {16, 68, 28, 13, 31, 37, 11, 17},
{15, 8, 73, 23, 15, 30, 22, 14}, {15, 18, 0, 85, 11, 17, 33, 15},
{16, 18, 19, 17, 9, 56, 56, 9}, {15, 19, 20, 16, 13, 30, 73, 12},
{15, 20, 20, 18, 13, 13, 71, 28}, {16, 18, 16, 26, 12, 8, 54, 47},
{17, 16, 17, 17, 17, 10, 54, 51}, {18, 17, 16, 18, 16, 15, 28, 73},
{18, 18, 15, 18, 16, 20, 14, 83}, {19, 19, 17, 18, 15, 21, 14, 82},
{18, 17, 16, 18, 17, 18, 7, 90}, {19, 18, 16, 19, 16, 17, 11, 87},
{20, 18, 16, 20, 17, 15, 15, 84}, {21, 19, 16, 22, 17, 15, 18, 81}
},
Otherwise, if mipSizeId is equal to 1 and modeId is equal to 5, the
following applies:
mWeight[x][y] = (8-96)
{
{11, 6, 13, 11, 75, 6, 12, 11}, {10, 3, 8, 13, 48, 2, 13, 10},
{10, 45, 1, 13, 19, 9, 12, 10}, {10, 42, 37, 8, 10, 12, 11, 10},
{11, 11, 10, 12, 18, 74, 6, 11}, {11, 12, 10, 12, 53, 47, 2, 12},
{10, 6, 10, 12, 71, 16, 9, 11}, {10, 15, 6, 13, 53, 5, 13, 10},
{10, 12, 10, 11, 9, 17, 77, 5}, {10, 11, 9, 12, 3, 51, 50, 2},
{10, 11, 9, 12, 11, 72, 18, 8}, {10, 11, 9, 12, 36, 57, 7, 10},
{10, 10, 10, 11, 10, 10, 16, 71}, {9, 11, 10, 11, 14, 0, 56, 39},
{9, 11, 9, 12, 12, 8, 76, 13}, {9, 12, 9, 12, 8, 35, 57, 7}
},
Otherwise, if mipSizeId is equal to 1 and modeId is equal to 6, the
following applies:
mWeight[x][y] = (8-97)
{
{23, 21, 23, 23, 101, 30, 19, 25}, {22, 13, 23, 24, 101, 29, 19, 25},
{22, 24, 14, 23, 101, 29, 18, 24}, {22, 23, 25, 17, 98, 29, 18, 24},
{23, 24, 23, 23, 0, 97, 36, 17}, {22, 25, 24, 22, 1, 97, 35, 17},
{22, 22, 25, 23, 1, 96, 36, 17}, {22, 22, 23, 24, 3, 94, 36, 17},
{22, 23, 23, 22, 31, 0, 93, 34}, {22, 23, 24, 23, 31, 2, 93, 33},
{22, 22, 24, 23, 31, 1, 92, 34}, {22, 22, 23, 23, 30, 3, 90, 35},
{23, 24, 23, 23, 19, 31, 2, 102}, {23, 23, 23, 24, 19, 30, 3, 101},
{23, 23, 24, 24, 19, 30, 3, 101}, {23, 23, 23, 24, 19, 31, 4, 100}
},
Otherwise, if mipSizeId is equal to 1 and modeId is equal to 7, the
following applies:
mWeight[x][y] = (8-98)
{
{10, 5, 10, 10, 56, 4, 11, 9}, {9, 22, 6, 10, 13, 9, 10, 10},
{9, 67, 22, 6, 10, 10, 10, 10}, {9, 6, 68, 18, 11, 9, 11, 9},
{10, 10, 10, 10, 40, 53, 3, 11}, {9, 6, 10, 9, 61, 9, 10, 9},
{9, 17, 6, 10, 23, 7, 9, 10}, {9, 56, 15, 8, 10, 11, 9, 10},
{10, 9, 11, 9, 4, 42, 54, 3}, {9, 10, 11, 9, 22, 67, 8, 8},
{10, 7, 11, 9, 57, 23, 7, 10}, {9, 11, 10, 10, 36, 8, 10, 9},
{10, 10, 11, 9, 13, 0, 41, 50}, {9, 9, 11, 9, 8, 24, 64, 8},
{10, 10, 11, 9, 15, 63, 18, 10}, {9, 10, 11, 10, 44, 33, 10, 11}
},
Otherwise, if mipSizeId is equal to 1 and modeId is equal to 8, the
following applies:
mWeight[x][y] = (8-99)
{
{21, 44, 37, 20, 24, 68, 10, 23}, {21, 1, 55, 39, 14, 39, 41, 18},
{21, 25, 0, 68, 18, 18, 42, 39}, {20, 24, 19, 36, 19, 14, 25, 72},
{21, 11, 28, 30, 18, 23, 80, 19}, {20, 25, 8, 38, 21, 13, 45, 62},
{20, 22, 18, 25, 19, 18, 16, 90}, {19, 21, 21, 24, 19, 21, 12, 91},
{21, 22, 15, 28, 21, 20, 23, 82}, {20, 21, 19, 24, 20, 22, 9, 95},
{19, 21, 21, 22, 20, 21, 13, 92}, {19, 22, 21, 22, 19, 21, 15, 90},
{20, 21, 20, 22, 21, 22, 15, 90}, {20, 21, 21, 22, 20, 21, 16, 89},
{19, 21, 20, 23, 19, 22, 15, 89}, {18, 21, 20, 23, 19, 23, 15, 87}
},
Otherwise, if mipSizeId is equal to 1 and modeId is equal to 9, the
following applies:
mWeight[x][y] = (8-100)
{
{14, 15, 18, 15, 51, 68, 39, 23}, {15, 4, 10, 20, 22, 76, 51, 27},
{15, 16, 1, 17, 13, 78, 55, 29}, {15, 13, 24, 0, 12, 76, 55, 27},
{15, 8, 10, 14, 10, 66, 72, 25}, {16, 12, 8, 14, 12, 59, 75, 27},
{17, 13, 9, 12, 13, 58, 75, 28}, {18, 14, 8, 13, 14, 60, 71, 29},
{15, 10, 11, 12, 12, 42, 79, 41}, {18, 14, 8, 14, 13, 45, 79, 39}, -continued {19, 14, 8, 14, 12, 44, 81, 38}, {20, 15, 10, 14, 13, 45, 78, 36},
{15, 11, 12, 13, 13, 24, 73, 62}, {18, 15, 8, 13, 15, 28, 89, 43},
{21, 14, 10, 14, 16, 29, 85, 45}, {21, 16, 9, 15, 17, 33, 78, 46}
},
Otherwise, if mipSizeId is equal to 2 and modeId is equal to 0, the
following applies:
mWeight[x][y] = (8-101)
{
{46, 7, 14, 92, 23, 20, 10}, {32, 22, 17, 52, 50, 25, 12},
{1, 36, 21, 27, 61, 30, 14}, {0, 30, 27, 17, 61, 32, 17},
{13, 12, 37, 13, 59, 35, 18}, {14, 13, 38, 11, 56, 38, 18},
{10, 27, 29, 9, 55, 39, 17}, {10, 27, 32, 7, 53, 38, 17},
{8, 17, 14, 15, 92, 27, 13}, {2, 16, 18, 8, 84, 38, 15},
{4, 12, 22, 7, 76, 44, 17}, {8, 8, 25, 7, 72, 46, 18},
{8, 8, 26, 8, 69, 46, 19}, {10, 11, 23, 9, 68, 47, 17},
{10, 11, 23, 8, 67, 47, 18}, {10, 12, 26, 9, 64, 43, 20},
{7, 10, 16, 11, 86, 37, 17}, {7, 9, 18, 9, 73, 47, 20},
{8, 8, 21, 9, 67, 50, 22}, {7, 9, 22, 9, 66, 50, 22},
{7, 9, 23, 8, 67, 48, 22}, {8, 9, 24, 8, 67, 48, 21},
{8, 9, 26, 8, 66, 49, 20}, {9, 8, 29, 8, 64, 48, 20},
{8, 8, 16, 8, 69, 56, 19}, {6, 9, 17, 8, 64, 55, 25},
{7, 8, 19, 8, 62, 53, 27}, {7, 8, 21, 8, 61, 52, 28},
{7, 9, 22, 7, 62, 52, 25}, {7, 9, 23, 6, 62, 53, 24},
{8, 7, 26, 6, 62, 52, 23}, {8, 8, 28, 6, 61, 51, 22},
{7, 9, 14, 7, 49, 74, 23}, {7, 7, 17, 7, 51, 65, 30},
{7, 8, 18, 6, 53, 57, 33}, {7, 8, 20, 5, 56, 57, 31},
{7, 8, 22, 6, 56, 57, 29}, {8, 8, 23, 5, 57, 57, 27},
{8, 7, 26, 5, 57, 56, 26}, {8, 6, 27, 5, 57, 55, 25},
{7, 8, 14, 6, 36, 65, 47}, {7, 7, 18, 5, 44, 59, 44},
{7, 7, 19, 5, 47, 59, 40}, {7, 7, 20, 5, 50, 59, 35},
{8, 6, 22, 5, 51, 58, 33}, {8, 5, 25, 5, 51, 59, 30},
{7, 6, 26, 5, 51, 59, 29}, {9, 6, 27, 5, 50, 59, 28},
{7, 8, 14, 6, 27, 44, 76}, {6, 8, 16, 5, 38, 57, 53},
{6, 7, 19, 4, 44, 63, 40}, {7, 6, 21, 4, 47, 62, 37},
{8, 6, 22, 4, 47, 62, 35}, {8, 6, 24, 5, 46, 64, 32},
{8, 6, 26, 5, 46, 63, 31}, {8, 6, 28, 6, 45, 62, 30},
{8, 7, 15, 6, 22, 43, 81}, {6, 8, 16, 5, 32, 64, 51},
{8, 8, 19, 5, 37, 66, 41}, {9, 5, 21, 4, 41, 67, 36},
{8, 7, 22, 5, 42, 65, 35}, {8, 6, 25, 6, 42, 64, 34},
{9, 5, 27, 7, 43, 63, 32}, {9, 5, 29, 8, 40, 60, 34}
},
Otherwise, if mipSizeId is equal to 2 and modeId is equal to 1, the
following applies:
mWeight[x][y] = (8-102)
{
{50, 47, 46, 61, 50, 45, 46}, {59, 49, 47, 57, 51, 45, 46},
{64, 52, 48, 55, 51, 46, 46}, {58, 61, 50, 53, 51, 46, 46},
{52, 66, 53, 52, 51, 46, 46}, {48, 62, 62, 50, 51, 46, 46},
{47, 49, 76, 49, 51, 46, 46}, {45, 33, 92, 49, 52, 46, 46},
{50, 48, 46, 57, 63, 45, 46}, {55, 52, 48, 55, 63, 45, 46},
{57, 56, 50, 53, 63, 45, 46}, {55, 60, 53, 51, 63, 46, 46},
{51, 60, 59, 51, 63, 46, 46}, {48, 55, 69, 49, 63, 46, 46},
{46, 42, 84, 48, 62, 46, 46}, {43, 28, 99, 48, 61, 47, 46},
{49, 49, 47, 48, 73, 47, 46}, {52, 52, 49, 47, 73, 48, 46},
{52, 55, 53, 47, 72, 48, 46}, {51, 56, 58, 46, 72, 48, 46},
{48, 54, 65, 46, 71, 48, 46}, {46, 47, 76, 45, 71, 49, 46},
{44, 34, 91, 44, 70, 49, 46}, {41, 23, 104, 45, 68, 50, 46},
{48, 48, 48, 44, 68, 59, 45}, {50, 51, 51, 43, 69, 58, 45},
{49, 52, 56, 43, 68, 58, 45}, {48, 52, 62, 42, 68, 58, 45},
{45, 48, 71, 42, 68, 58, 45}, {43, 38, 84, 41, 68, 59, 45},
{41, 27, 98, 41, 67, 59, 45}, {38, 19, 109, 42, 66, 59, 45},
{47, 47, 49, 44, 52, 74, 45}, {48, 48, 53, 43, 54, 74, 45},
{47, 48, 60, 43, 55, 73, 45}, {45, 46, 68, 43, 55, 73, 45},
{43, 40, 78, 42, 56, 72, 45}, {41, 30, 91, 42, 57, 72, 45},
{38, 20, 105, 41, 57, 71, 45}, {36, 13, 114, 41, 57, 70, 46},
{46, 47, 50, 45, 43, 77, 51}, {46, 46, 56, 44, 44, 78, 51},
{45, 43, 64, 43, 45, 77, 51}, {43, 39, 73, 43, 45, 77, 51},
{40, 31, 85, 42, 46, 77, 51}, {38, 22, 98, 42, 46, 77, 51},
{35, 12, 111, 42, 47, 76, 51}, {33, 7, 119, 41, 48, 75, 52},
{46, 46, 51, 45, 44, 57, 71}, {45, 43, 59, 44, 44, 58, 70},
{43, 37, 68, 43, 45, 58, 70}, {40, 31, 80, 43, 45, 58, 70},
{38, 22, 92, 43, 46, 58, 70}, {36, 13, 105, 43, 46, 58, 70},
{33, 5, 117, 42, 47, 58, 70}, {31, 2, 123, 42, 48, 57, 71},
{45, 41, 55, 45, 51, 24, 96}, {44, 36, 64, 44, 52, 23, 97},
{42, 29, 75, 43, 53, 23, 97}, {39, 22, 86, 43, 52, 24, 97},
{37, 14, 98, 43, 53, 24, 97}, {34, 7, 109, 42, 53, 25, 97},
{32, 1, 118, 41, 53, 25, 97}, {30, 0, 123, 41, 53, 26, 96}
}, Otherwise, if mipSizeId is equal to 2 and modeId is equal to 2, the
following applies:
mWeight[x][y] = (8-103)
{
{20, 16, 16, 76, 9, 18, 16}, {37, 15, 16, 71, 11, 17, 16},
{65, 13, 17, 67, 12, 17, 16}, {63, 30, 15, 63, 14, 17, 16},
{30, 62, 13, 57, 16, 17, 16}, {14, 62, 28, 52, 18, 16, 16},
{21, 22, 64, 46, 21, 15, 16}, {26, 0, 81, 40, 24, 15, 17},
{23, 16, 16, 69, 48, 8, 18}, {28, 18, 16, 66, 50, 8, 17},
{36, 17, 17, 61, 54, 7, 18}, {40, 20, 17, 56, 57, 7, 18},
{34, 29, 18, 50, 61, 6, 18}, {27, 34, 22, 44, 64, 5, 18},
{25, 22, 37, 37, 67, 5, 18}, {26, 9, 51, 31, 68, 6, 18},
{18, 17, 17, 17, 87, 9, 17}, {19, 17, 17, 15, 88, 9, 17},
{20, 18, 17, 14, 88, 10, 17}, {22, 17, 18, 12, 87, 12, 17},
{23, 18, 19, 11, 85, 15, 16}, {23, 20, 19, 11, 83, 18, 16},
{22, 19, 22, 10, 79, 22, 16}, {22, 16, 28, 11, 74, 26, 15},
{16, 17, 16, 7, 58, 50, 10}, {17, 17, 16, 8, 53, 55, 10},
{18, 17, 17, 10, 47, 60, 9}, {18, 16, 17, 11, 43, 64, 9},
{19, 16, 17, 12, 38, 68, 9}, {20, 17, 18, 13, 35, 72, 9},
{20, 17, 19, 14, 31, 74, 9}, {20, 16, 21, 13, 29, 74, 11},
{17, 16, 16, 16, 15, 86, 11}, {18, 15, 17, 16, 13, 86, 13},
{18, 16, 16, 16, 13, 84, 15}, {18, 15, 17, 16, 12, 82, 18},
{19, 16, 17, 16, 12, 79, 21}, {18, 16, 17, 16, 12, 76, 24},
{18, 16, 17, 15, 12, 73, 28}, {19, 16, 19, 15, 14, 68, 31},
{17, 17, 16, 17, 10, 59, 43}, {17, 16, 16, 17, 10, 54, 47},
{18, 16, 16, 17, 11, 48, 52}, {18, 16, 16, 16, 12, 44, 56},
{17, 17, 16, 13, 40, 59}, {17, 17, 16, 16, 13, 37, 62},
{17, 17, 17, 15, 14, 34, 65}, {18, 16, 18, 16, 14, 32, 66},
{17, 16, 16, 15, 16, 17, 79}, {17, 16, 16, 16, 16, 15, 81},
{18, 16, 16, 16, 16, 14, 82}, {18, 16, 16, 15, 16, 13, 83},
{17, 18, 16, 15, 16, 13, 83}, {17, 17, 17, 15, 16, 13, 84},
{17, 17, 17, 15, 16, 13, 84}, {17, 16, 18, 15, 16, 13, 83},
{16, 16, 16, 16, 17, 3, 92}, {17, 16, 16, 15, 17, 4, 91},
{18, 17, 17, 14, 18, 4, 90}, {18, 17, 16, 14, 18, 4, 91},
{17, 18, 16, 15, 18, 4, 91}, {17, 18, 17, 15, 18, 4, 90},
{17, 17, 18, 14, 18, 4, 90}, {18, 16, 19, 15, 18, 5, 89}
},
Otherwise, if mipSizeId is equal to 2 and modeId is equal to 3, the
following applies:
mWeight[x][y] = (8-104)
{
{13, 9, 10, 43, 11, 12, 9}, {43, 2, 11, 22, 15, 12, 10},
{73, 2, 11, 16, 16, 12, 9}, {52, 38, 5, 13, 16, 12, 10},
{11, 71, 6, 12, 14, 13, 10}, {3, 50, 35, 10, 14, 13, 9},
{11, 12, 68, 11, 13, 13, 10}, {13, 3, 74, 12, 11, 15, 10},
{20, 9, 10, 51, 29, 11, 10}, {41, 5, 10, 37, 26, 13, 10},
{58, 9, 10, 23, 27, 14, 9}, {41, 36, 6, 15, 24, 16, 10},
{14, 57, 11, 11, 21, 18, 9}, {7, 39, 37, 9, 18, 19, 9},
{12, 9, 63, 10, 15, 20, 9}, {15, 2, 68, 11, 12, 21, 10},
{16, 11, 11, 19, 60, 11, 11}, {27, 11, 11, 20, 50, 16, 10},
{35, 15, 11, 17, 42, 20, 10}, {29, 29, 11, 12, 35, 23, 10},
{17, 37, 18, 8, 29, 26, 9}, {13, 26, 35, 6, 24, 27, 9},
{15, 8, 53, 7, 19, 27, 10}, {16, 4, 57, 9, 14, 28, 11},
{12, 11, 11, 5, 51, 36, 8}, {15, 13, 12, 8, 45, 36, 9},
{19, 16, 14, 9, 38, 38, 9}, {19, 21, 16, 8, 32, 39, 10},
{18, 22, 21, 7, 27, 39, 10}, {18, 16, 31, 7, 22, 39, 11},
{18, 9, 41, 6, 18, 39, 11}, {19, 7, 44, 7, 15, 37, 13},
{11, 12, 11, 9, 18, 64, 10}, {11, 12, 13, 10, 18, 61, 11},
{13, 13, 15, 10, 17, 58, 12}, {15, 14, 17, 10, 16, 56, 13},
{17, 14, 20, 9, 14, 55, 13}, {18, 11, 26, 9, 13, 52, 14},
{19, 9, 31, 8, 11, 50, 15}, {19, 9, 33, 8, 10, 46, 17},
{10, 11, 12, 11, 4, 59, 28}, {11, 10, 13, 11, 4, 60, 26},
{12, 10, 15, 11, 5, 59, 25}, {14, 10, 16, 11, 5, 58, 24},
{15, 10, 18, 11, 4, 57, 24}, {17, 9, 21, 11, 4, 56, 24},
{19, 9, 23, 10, 4, 53, 24}, {19, 9, 26, 10, 5, 49, 25},
{10, 10, 12, 11, 5, 27, 60}, {11, 8, 14, 11, 3, 34, 54},
{13, 8, 15, 12, 2, 38, 50}, {13, 8, 15, 13, 1, 41, 47},
{15, 8, 17, 13, 0, 42, 45}, {16, 8, 18, 13, 0, 44, 43},
{18, 8, 19, 12, 0, 44, 41}, {19, 9, 21, 12, 1, 43, 39},
{11, 8, 12, 11, 6, 9, 77}, {13, 7, 13, 12, 4, 16, 72},
{15, 6, 14, 13, 2, 21, 67}, {15, 6, 14, 13, 1, 25, 63},
{15, 7, 15, 14, 0, 27, 61}, {16, 8, 15, 14, 0, 29, 58},
{17, 8, 17, 14, 0, 29, 56}, {18, 8, 18, 14, 1, 30, 53}
}, -continued Otherwise, if mipSizeId is equal to 2 and modeId is equal to 4, the following applies:
mWeight[x][y] = (8-105)
{
{15, 13, 13, 55, 12, 13, 13}, {21, 13, 13, 34, 14, 13, 13},
{39, 12, 13, 22, 14, 13, 13}, {55, 18, 12, 18, 14, 14, 13},
{48, 37, 11, 16, 14, 14, 13}, {23, 62, 13, 14, 14, 13, 13},
{11, 53, 35, 14, 14, 13, 12}, {15, 13, 72, 14, 14, 13, 12},
{16, 13, 13, 63, 27, 12, 13}, {17, 13, 13, 58, 19, 13, 13},
{22, 13, 13, 43, 18, 13, 13}, {33, 14, 12, 31, 17, 14, 13},
{45, 18, 12, 24, 16, 14, 12}, {44, 32, 12, 19, 15, 14, 13},
{29, 49, 15, 17, 14, 14, 12}, {18, 44, 33, 16, 15, 13, 12},
{15, 13, 13, 32, 60, 10, 13}, {16, 13, 13, 45, 44, 12, 13},
{17, 14, 13, 49, 32, 13, 12}, {21, 14, 13, 44, 25, 14, 12},
{30, 14, 13, 37, 21, 14, 12}, {39, 16, 13, 30, 18, 14, 12},
{39, 27, 13, 24, 17, 14, 12}, {31, 38, 16, 21, 17, 13, 12},
{13, 13, 13, 13, 64, 27, 11}, {14, 13, 13, 23, 61, 19, 12},
{15, 14, 13, 34, 51, 16, 12}, {17, 14, 13, 40, 42, 15, 12},
{20, 14, 13, 40, 34, 14, 12}, {27, 14, 13, 37, 29, 14, 12},
{33, 16, 13, 32, 25, 13, 12}, {33, 24, 14, 27, 23, 13, 12},
{13, 13, 13, 13, 33, 61, 9}, {13, 13, 13, 15, 47, 44, 10},
{14, 13, 13, 20, 54, 31, 11}, {15, 13, 13, 27, 53, 23, 11},
{16, 14, 13, 32, 49, 18, 12}, {19, 14, 13, 34, 43, 15, 12},
{24, 14, 13, 34, 37, 14, 12}, {28, 17, 13, 31, 32, 14, 12},
{13, 14, 13, 15, 10, 71, 20}, {13, 13, 13, 15, 22, 66, 13},
{14, 13, 13, 15, 37, 53, 11}, {14, 13, 13, 18, 47, 40, 11},
{14, 13, 13, 23, 52, 29, 11}, {15, 14, 13, 27, 51, 23, 11},
{18, 14, 13, 30, 47, 19, 11}, {22, 15, 13, 30, 42, 17, 12},
{13, 13, 13, 14, 12, 34, 57}, {13, 13, 13, 15, 14, 50, 38},
{13, 13, 13, 15, 21, 58, 23}, {14, 13, 13, 16, 32, 54, 16},
{13, 13, 13, 18, 41, 45, 13}, {13, 14, 13, 21, 47, 36, 12},
{14, 14, 13, 24, 49, 28, 12}, {17, 14, 13, 26, 46, 24, 12},
{13, 13, 13, 13, 19, 0, 85}, {13, 13, 13, 13, 20, 12, 72},
{13, 13, 13, 15, 20, 30, 53}, {13, 13, 13, 16, 23, 44, 35},
{13, 14, 12, 17, 29, 47, 24}, {13, 14, 13, 18, 36, 44, 18},
{13, 14, 13, 20, 41, 38, 16}, {15, 14, 14, 22, 42, 33, 15}
},
Otherwise (mipSizeId is equal to 2 and modeId is equal to 5), the following applies:
mWeight[x][y] = (8-106)
{
{24, 9, 10, 52, 13, 10, 12}, {53, 9, 10, 25, 26, 6, 13},
{48, 30, 9, 11, 30, 7, 13}, {15, 59, 12, 6, 25, 13, 11},
{5, 48, 34, 7, 18, 19, 10}, {10, 15, 62, 8, 12, 20, 13},
{13, 2, 70, 8, 9, 19, 19}, {13, 3, 62, 9, 6, 16, 30},
{25, 14, 10, 40, 51, 0, 14}, {20, 28, 11, 16, 55, 5, 13},
{8, 38, 18, 6, 41, 20, 11}, {5, 28, 34, 6, 23, 31, 12},
{9, 12, 48, 8, 12, 33, 18}, {12, 2, 53, 9, 6, 30, 28},
{14, 1, 50, 9, 4, 23, 40}, {14, 5, 42, 8, 4, 15, 51},
{8, 20, 12, 5, 72, 12, 12}, {2, 24, 19, 5, 46, 35, 9},
{5, 16, 29, 9, 21, 48, 13}, {9, 6, 36, 10, 9, 45, 25},
{12, 3, 37, 11, 5, 36, 38}, {13, 4, 34, 11, 4, 25, 51},
{13, 6, 29, 10, 4, 16, 61}, {13, 9, 26, 10, 6, 11, 66},
{6, 14, 15, 6, 31, 60, 6}, {7, 10, 22, 11, 12, 64, 15},
{10, 6, 26, 13, 6, 50, 32}, {11, 4, 27, 12, 5, 33, 49},
{12, 5, 25, 11, 6, 20, 62}, {12, 7, 22, 11, 7, 13, 69},
{12, 9, 19, 11, 7, 8, 74}, {12, 10, 19, 10, 8, 7, 74},
{10, 9, 16, 12, 6, 67, 20}, {11, 6, 20, 13, 5, 46, 41},
{11, 5, 21, 12, 7, 26, 59}, {11, 7, 19, 12, 9, 14, 70},
{11, 8, 18, 11, 10, 8, 75}, {11, 9, 16, 11, 10, 5, 78},
{12, 10, 15, 11, 10, 4, 80}, {11, 10, 15, 10, 10, 4, 78},
{11, 9, 15, 12, 8, 34, 54}, {11, 7, 17, 11, 10, 16, 69},
{11, 7, 17, 11, 11, 7, 76}, {11, 8, 16, 11, 11, 4, 80},
{10, 10, 14, 11, 11, 3, 81}, {11, 10, 13, 11, 12, 2, 82},
{11, 10, 13, 11, 12, 2, 82}, {11, 11, 13, 10, 12, 3, 80},
{11, 9, 14, 11, 11, 8, 77}, {11, 8, 14, 11, 12, 3, 81},
{11, 9, 14, 11, 12, 1, 83}, {10, 10, 13, 11, 12, 2, 83},
{10, 11, 12, 11, 12, 2, 82}, {10, 11, 12, 11, 12, 3, 82},
{11, 11, 11, 11, 12, 3, 81}, {11, 11, 11, 11, 13, 5, 79},
{11, 10, 13, 11, 13, 2, 82}, {11, 9, 13, 11, 13, 1, 83},
{11, 10, 12, 11, 13, 2, 82}, {10, 11, 12, 11, 12, 3, 81},
{10, 11, 12, 11, 12, 4, 80}, {10, 11, 11, 11, 12, 5, 80},
{11, 11, 11, 11, 13, 5, 79}, {11, 11, 11, 11, 12, 6, 77}
}.

The invention claimed is:

1. A matrix based intra prediction (MIP) method for predicting samples of a current block, the method comprising:

storing a set of MIP weight matrices;

determining the width (W) and the height (H) of the current block;

setting a mipSizeId variable to 1 as a result of: i) determining that W=4 and H=16 or ii) determining that W=16 and H=4;

storing a value, predModeIntra, that specifies a MIP prediction mode for the current block;

determining a modeId value based on: i) predModeIntra, which specifies the MIP prediction mode for the current block, and ii) the value of the mipSizeId variable; and selecting, from the set of MIP weight matrices, a MIP weight matrix to be used for the current block, wherein the selection is based on modeId and the value of the mipSizeId variable.

2. The method of claim 1, further comprising storing a look-up table that maps different mipSizeId-modeId pairs to different MIP weight matrices, wherein selecting the MIP weight matrix comprises using the look-up table to select the MIP weight matrix.

3. The method of claim 1, further comprising determining original boundary sample values for the current block, wherein the original boundary samples are W samples from the nearest neighbouring samples to the above of the current block and H samples from the nearest neighbouring samples to the left of the current block.

4. The method of claim 3, further comprising:

determining the size of a reduced boundary $bdry_{red}$ based on the mipSizeId value of the current block;

determining a dimension size of a reduced prediction signal $pred_{red}$ based on the mipSizeId value of the current block;

deriving the reduced boundary $bdry_{red}$ from the original boundary samples;

deriving the reduced prediction signal $pred_{red}^{temp}$ by matrix multiplication of the selected MIP weight matrix and the reduced boundary $bdry_{red}$; and deriving the reduced prediction signal $pred_{red}$ by using sample value clipping on each sample of the pre-$d_{red}^{temp}$.

5. The method of claim 4, further comprising:

determining whether or not to i) apply vertical linear interpolation to the reduced prediction signal $pred_{red}$ based on the width W and the height H of the current block and ii) apply horizontal linear interpolation to the reduced prediction signal $pred_{red}$ based on the width W and the height H of the current block.

6. The method of claim 5, further comprising:

as a result of determining to apply both vertical and horizontal linear interpolation, determining, based on the width W and the height H of the current block, whether to apply vertical linear interpolation before horizontal linear interpolation or to apply horizontal linear interpolation before vertical linear interpolation.

7. The method of claim 6, further comprising:

as a result of determining to apply horizontal linear interpolation before vertical linear interpolation, determining the size of the reduced left boundary $bdry_{redII}^{left}$ for the horizontal linear interpolation based on the width W and the height H of the current block.

8. The method of claim 7, further comprising deriving the reduced left boundary $bdry_{redII}^{left}$ from the original left boundary samples.

9. The method of claim 8, further comprising:

deriving the MIP prediction block pred by generating the sample values at the remaining positions by using linear interpolation; and decoding the current block by using the derived MIP prediction block.

10. The method of claim 1, further comprising:

determining a dimension size of a reduced prediction signal $pred_{red}$ based on the mipSizeId value of the current block.

11. The method of claim 10, further comprising:

deriving a reduced prediction signal $pred_{red}{}^{temp}$ by matrix multiplication of the selected MIP weight matrix and a reduced boundary $bdry_{red}$; and deriving the reduced prediction signal $pred_{red}$ by using sample value clipping on each sample of the pre-$d_{red}{}^{temp}$.

12. A computer program comprising instructions which when executed by processing circuitry causes the processing circuitry to perform the method of claim 1.

13. A carrier containing the computer program of claim 12, wherein the carrier is one of an electronic signal, an optical signal, a radio signal, and a computer readable storage medium.

14. An apparatus for predicting samples of a current block, the apparatus comprising:

a data storage unit; and processing circuitry coupled to the data storage unit, wherein the apparatus is configured to:

store a set of MIP weight matrices;

determine the width, W, and the height, H, of the current block;

set a mipSizeId variable to 1 as a result of: i) determining that W=4 and H=16 or ii) determining that W=16 and H=4;

store a value, predModeIntra, that specifies a MIP prediction mode for the current block;

determine, based on predModeIntra and the value of the mipSizeId variable, a modeId value; and select, from the set of MIP weight matrices, a MIP weight matrix to be used for the current block, wherein the selection is based on modeId and the value of the mipSizeId variable.

15. The apparatus of claim 14, wherein the apparatus is further configured to store a look-up table that maps different mipSizeId-modeId pairs to different MIP weight matrices, wherein the apparatus is configured to select the MIP weight matrix by using the look-up table to select the MIP weight matrix.

16. The apparatus of claim 14, wherein the apparatus is further configured to determine original boundary sample values for the current block, wherein the original boundary samples are W samples from the nearest neighbouring samples to the above of the current block and H samples from the nearest neighbouring samples to the left of the current block.

17. The apparatus of claim 16, wherein the apparatus is further configured to:

determine the size of a reduced boundary $bdry_{red}$ based on the mipSizeId value of the current block;

determine a dimension size of a reduced prediction signal $pred_{red}$ based on the mipSizeId value of the current block;

derive the reduced boundary $bdry_{red}$ from the original boundary samples;

derive the reduced prediction signal $pred_{red}{}^{temp}$ by matrix multiplication of the selected MIP weight matrix and the reduced boundary $bdry_{red}$, and derive the reduced prediction signal $pred_{red}$ by using sample value clipping on each sample of the pre-$d_{red}{}^{temp}$.

18. The apparatus of claim 17, wherein the apparatus is further configured to:

determine whether or not to i) apply vertical linear interpolation to the reduced prediction signal $pred_{red}$ based on the width W and the height H of the current block and ii) apply horizontal linear interpolation to the reduced prediction signal $pred_{red}$ based on the width W and the height H of the current block.

19. The apparatus of claim 18, wherein the apparatus is further configured to:

as a result of determining to apply both vertical and horizontal linear interpolation, determine, based on the width W and the height H of the current block, whether to apply vertical linear interpolation before horizontal linear interpolation or to apply horizontal linear interpolation before vertical linear interpolation.

20. The apparatus of claim 19, wherein the apparatus is further configured to:

as a result of determining to apply horizontal linear interpolation before vertical linear interpolation, determine the size of the reduced left boundary $bdry_{redII}{}^{left}$ for the horizontal linear interpolation based on the width W and the height H of the current block.

\* \* \* \* \*